United States Patent
Yoshizawa et al.

(10) Patent No.: US 7,241,332 B2
(45) Date of Patent: Jul. 10, 2007

(54) INK JET YELLOW INK, INK SET, INK JET RECORDING METHOD, INK CARTRIDGE, RECORDING UNIT, AND INK JET RECORDING APPARATUS

(75) Inventors: Jun Yoshizawa, Tokyo (JP); Shin-ichi Sato, Kawasaki (JP); Kunihiko Nakamura, Gotenba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/339,651

(22) Filed: Jan. 26, 2006

(65) Prior Publication Data

US 2006/0119683 A1 Jun. 8, 2006

Related U.S. Application Data

(63) Continuation of application No. PCT/JP2005/014242, filed on Jul. 28, 2005.

(30) Foreign Application Priority Data

Jul. 29, 2004 (JP) ............................. 2004-221836
Jul. 26, 2005 (JP) ............................. 2005-216228

(51) Int. Cl.
*C09D 11/02* (2006.01)
(52) U.S. Cl. ................... 106/31.47; 106/31.49; 106/31.5
(58) Field of Classification Search ............ 106/31.47, 106/31.49, 31.5; 347/100
See application file for complete search history.

(56) References Cited

U.S. PATENT DOCUMENTS

| | | | |
|---|---|---|---|
| 4,202,870 A | 5/1980 | Weber et al. | 423/630 |
| 4,242,271 A | 12/1980 | Weber et al. | 260/448 AD |
| 4,248,852 A | 2/1981 | Wakabayashi et al. | 423/626 |
| 4,723,129 A | 2/1988 | Endo et al. | 346/1.1 |
| 4,740,796 A | 4/1988 | Endo et al. | 346/1.1 |
| 5,091,009 A | 2/1992 | Nogami et al. | 106/287.1 |
| 5,123,960 A * | 6/1992 | Shirota et al. | 106/31.46 |
| 5,221,497 A | 6/1993 | Watanabe et al. | 252/313.2 |
| 5,268,459 A | 12/1993 | Gregory et al. | 534/758 |
| 5,395,434 A | 3/1995 | Tochihara et al. | 106/22 R |
| 5,415,686 A | 5/1995 | Kurabayashi et al. | 106/26 R |

(Continued)

FOREIGN PATENT DOCUMENTS

JP 57-44605 B2 9/1982

(Continued)

Primary Examiner—Helene Klemanski
(74) Attorney, Agent, or Firm—Fitzpatrick, Cella, Harper & Scinto

(57) ABSTRACT

To provide an ink jet yellow ink to be used in combination with ink excellent in light resistance and environmental gas resistance with a color fading balance with respect to light and an environmental gas between the inks uniformized. The ink jet yellow ink is an ink jet yellow ink to be used for forming an image together with a cyan ink comprising a compound represented by a general formula (1) or a compound represented by a general formula (2) as a coloring material, the ink jet yellow ink comprising: at least one kind of coloring material selected from the following A group; and at least one kind of coloring material selected from the following B group.
A group: C.I. Direct Yellow 132 and C.I. Direct Yellow 173
B group: C.I. Direct Yellow 142, C.I. Direct Yellow 86, and a compound represented by a general formula (3).

7 Claims, 9 Drawing Sheets

U.S. PATENT DOCUMENTS

| | | | |
|---|---|---|---|
| 5,451,251 A | 9/1995 | Mafune et al. | 106/22 H |
| 5,482,545 A | 1/1996 | Aoki et al. | 106/22 K |
| 5,485,188 A | 1/1996 | Tochihara et al. | 347/100 |
| 5,835,116 A | 11/1998 | Sato et al. | 347/98 |
| 5,933,164 A | 8/1999 | Sato et al. | 347/43 |
| 6,003,987 A | 12/1999 | Yamamoto et al. | 347/105 |
| 6,027,210 A | 2/2000 | Kurabayashi et al. | 347/100 |
| 6,186,615 B1 | 2/2001 | Sato et al. | 347/43 |
| 6,238,045 B1 | 5/2001 | Ono et al. | 347/96 |
| 6,322,209 B1 | 11/2001 | Sato et al. | 347/105 |
| 6,511,534 B1 | 1/2003 | Mishina et al. | 106/31.33 |
| 6,698,876 B2 | 3/2004 | Sato et al. | 347/100 |
| 6,712,462 B2 | 3/2004 | Ito et al. | 347/100 |
| 6,779,881 B2 | 8/2004 | Ito et al. | 347/100 |
| 6,790,266 B2 | 9/2004 | Koga et al. | 106/31.27 |
| 6,976,755 B2 | 12/2005 | Sato et al. | 347/100 |
| 7,087,107 B2 | 8/2006 | Tateishi et al. | 106/31.49 |
| 2004/0099180 A1 | 5/2004 | Kitayama et al. | 106/31.46 |
| 2005/0005818 A1 | 1/2005 | Sato et al. | 106/31.27 |
| 2005/0131194 A1 | 6/2005 | Aikawa et al. | 523/160 |
| 2006/0102046 A1* | 5/2006 | Okamura et al. | 106/31.47 |
| 2006/0102047 A1* | 5/2006 | Yoshizawa et al. | 106/31.47 |
| 2006/0102048 A1 | 5/2006 | Nakamura et al. | 106/31.52 |
| 2006/0103705 A1 | 5/2006 | Yoshizawa et al. | 347/100 |
| 2006/0103706 A1 | 5/2006 | Aikawa et al. | 347/100 |
| 2006/0109324 A1 | 5/2006 | Fujimoto et al. | 347/100 |
| 2006/0119682 A1* | 6/2006 | Okamura et al. | 347/100 |
| 2006/0119683 A1 | 6/2006 | Yoshizawa et al. | 347/100 |
| 2006/0119685 A1 | 6/2006 | Yamashita et al. | 347/100 |
| 2006/0124027 A1 | 6/2006 | Sato | 106/31.6 |
| 2006/0137570 A1* | 6/2006 | Osumi et al. | 106/31.27 |
| 2006/0146108 A1 | 7/2006 | Sato et al. | 347/100 |
| 2006/0152569 A1* | 7/2006 | Jinnou et al. | 347/105 |
| 2006/0156952 A1 | 7/2006 | Takayama et al. | 106/31.52 |

FOREIGN PATENT DOCUMENTS

| | | |
|---|---|---|
| JP | 2-233781 | 9/1990 |
| JP | 4-233975 | 8/1992 |
| JP | 8-73791 | 3/1996 |
| JP | 2803134 B2 | 9/1998 |
| JP | 2881847 B2 | 4/1999 |
| JP | 11-209673 | 8/1999 |
| JP | 2000-303009 | 10/2000 |
| JP | 2001-288392 | 10/2001 |
| JP | 2002-249677 | 9/2002 |
| JP | 2002-294111 | 10/2002 |
| JP | 2002-338853 | 11/2002 |
| JP | 2002-338854 | 11/2002 |
| JP | 2003-138169 | 5/2003 |
| JP | 2003-238850 | 8/2003 |
| JP | 2003-238870 | 8/2003 |
| JP | 2003-253176 | 9/2003 |
| JP | 2003-286423 | 10/2003 |
| JP | 2003-321627 | 11/2003 |
| WO | WO 2004/104108 | 12/2004 |
| WO | WO 2005/033211 | 4/2005 |

* cited by examiner

INK JET YELLOW INK, INK SET, INK JET RECORDING METHOD, INK CARTRIDGE, RECORDING UNIT, AND INK JET RECORDING APPARATUS

This application is a continuation of International Application No. PCT/JP2005/014242 filed on Jul. 28, 2005, which claims the benefit of Japanese Patent Application Nos. 2004-221836 filed on Jul. 29, 2004 and 2005-216228 filed on Jul. 26, 2005.

BACKGROUND OF THE INVENTION

1. Field of the Invention

The present invention relates to an ink jet yellow ink, an ink set, an ink jet recording method, an ink cartridge, a recording unit, and an ink jet recording apparatus each of which is capable of providing an image excellent in image storage stability, especially environmental gas resistance and light resistance.

2. Related Background Art

An ink jet recording method is a recording method of applying a small ink droplet to any one of recording media such as plain paper and glossy media to form an image, and had become rapidly widespread owing to a reduction in costs and improvement in its recording rate. With the rapid spread of digital cameras in addition to an improvement in quality of images recorded by the method, the method has been generally used as a method of outputting photographic images comparable to the silver halide photograph.

In recent years, image quality has undergone improvement more than ever owing to, for example, extreme reduction in size of an ink droplet and an improvement of color gamut involved in the introduction of multi-color ink. Meanwhile, there have been growing demands for coloring materials and inks, and stricter properties have been required in respect of improvement of color developability and reliability concerning anti-clogging or ejection stability.

Meanwhile, the ink jet recording method is problematic in terms of, for example, the image storage stability of the resultant recorded article. In general, the recorded article obtained by means of the ink jet recording method is inferior in image storage stability to the silver halide photograph, and involves the emergence of a problem in that a coloring material on the recorded article is apt to deteriorate to cause a change in color tone of an image and the color fading of the image when the recorded article is exposed to light, humidity, heat, an environmental gas present in the air, or the like for a long period of time.

A large number of proposals have been conventionally made in order to improve light resistance out of image storage stability. A new coloring material has been proposed for improving the light resistance of each of yellow ink and magenta ink each of which has particularly low light resistance out of cyan ink, the magenta ink, and the yellow ink. C.I. Direct Yellow 86 (see, for example, Japanese Patent Application Laid-Open No. H04-233975) and C.I Direct Yellow 173 (see, for example, Japanese Patent Application Laid-Open No. H02-233781) have been proposed as yellow coloring materials. A novel monoazo dye (see, for example, Japanese Patent Application Laid-Open No. H08-073791 and a novel anthrapyridone dye (see, for example, Japanese Patent Application Laid-Open No. H11-209673) have been proposed as magenta coloring materials.

Active investigation has been made on fastness properties with respect to an environmental gas such as ozone, $NO_x$, or $SO_2$ present in a trace amount in the air, that is, environmental gas resistance that is of most concern out of image storage stability in an ink jet recorded article by taking the coloring material of cyan ink that is most susceptible to the environmental gas as an example. A novel phthalocyanine dye has been proposed as an example of the coloring material (see, for example, Japanese Patent Applications Laid-Open No. 2002-249677 and No. 2000-303009).

The use of a specific coloring material having high fastness properties for each color has been proposed for improving the light resistance of an ink set in consideration of a color balance between inks of respective colors (see, for example, Japanese Patent Applications Laid-Open No. 2001-288392, No. 2002-338853, No. 2002-294111, and No. 2003-138169). There has been also proposed a method of improving ozone resistance (see, for example, Japanese Patent Applications Laid-Open No. 2003-238850 and No. 2003-286423).

However, no technique in consideration of a color fading balance has been conventionally established in terms of a correlation between yellow ink and any other color ink.

SUMMARY OF THE INVENTION

Evaluation on resistance to only an ozone gas as an environmental gas has been conventionally made. However, the inventors of the present invention have made studies to find that evaluation only on an ozone gas may not correspond to the image storage stability when a recorded article having an actual image such as a photograph printed thereon is stored. This is because a recorded article having an image such as a photograph printed thereon is often stored in an environment containing a large amount of acid gases such as $NO_x$ and $SO_2$ as well as an ozone gas such as a room. The inventors have found that a recorded article having an actual image such as a photograph printed thereon can be evaluated for image storage stability by performing evaluation on image storage stability in an environment containing a large amount of acid gases such as $NO_x$ and $SO_2$ as well as an ozone gas. As a result, the inventors of the present invention have acknowledged that ink capable of improving the image storage stability of a recorded article having an image such as a photograph printed thereon in an environment containing a large amount of acid gases such as $NO_x$ and $SO_2$ as well as an ozone gas is needed.

The inventors of the present invention have made studies to find the following. That is, for example, when a recorded article obtained by means of conventional ink such as yellow ink, magenta ink, or cyan ink is exposed to an environmental gas for a long time period, the entire recorded article yellows to thereby make the deterioration of an image remarkable. This is because, for example, (1) the yellow ink, the magenta ink, and the cyan ink can be arranged into the cyan ink, the magenta ink, and the yellow ink in order of decreasing degree of color fading in each color, (2) the color of the coloring material of the cyan ink changes to a yellowish color when the coloring material deteriorates, and (3) a recording medium yellows owing to $NO_x$ or the like in the environmental gas.

Accordingly, an effective measure to improve environmental gas resistance involves uniformizing a color fading balance among yellow ink, magenta ink, and cyan ink in a recorded article while taking a change in color of the coloring material of the cyan ink and the yellowing of a recording medium in consideration, to thereby maintain a color balance even when color fading occurs. In other words, it is important to satisfy a correlation between yellow ink and at least one kind of other ink.

The inventors of the present invention have made further studies to find that an acceleration test using an environmental gas present in the atmosphere of a room environment is essential to the case where an acceleration test in which a state where a recorded article having an image such as a photograph printed thereon is presented in a room, the state causing a problem in terms of image storage stability, is simulated with improved accuracy is performed. Therefore, it is necessary to perform an acceleration test in a mixed gas system taking into considerations an influence of ant acid gas such as $NO_x$ present at a higher concentration than that of ozone in the atmosphere of a general room environment rather than an influence of an ozone gas alone that has been conventionally considered to have the largest influence on an image obtained by means of an ink jet recording method. Therefore, the inventors of the present invention have concluded that the improvement of image storage stability with respect to a mixed gas containing three kinds of gases, that is, an ozone gas, and $NO_x$ and $SO_2$ as acid gases, as environmental gas resistance is essential to the improvement of image storage stability in a state where a recorded article is presented in a room.

Therefore, an object of the present invention is to provide an ink jet yellow ink to be used in combination with an ink jet cyan ink containing a specific coloring material excellent in light resistance and environmental gas resistance with a color fading balance with respect to light and an environmental gas between the yellow ink and the cyan ink uniformized.

Another object of the present invention is to provide an ink jet yellow ink to be used in combination with an ink jet magenta ink containing a specific coloring material excellent in light resistance and environmental gas resistance with a color fading balance with respect to light and an environmental gas between the yellow ink and the magenta ink-uniformized.

Another object of the present invention is to provide an ink jet yellow ink to be used in combination with an ink jet magenta ink and an ink jet cyan ink each containing a specific coloring material with a color fading balance with respect to light and an environmental gas among the three color inks uniformized.

Another object of the present invention is to provide an ink set containing at least an ink jet magenta ink, an ink jet cyan ink, and an ink jet yellow ink each containing a specific coloring material with a color fading balance with respect to light and an environmental gas among the three color inks uniformized.

Another object of the present invention is to provide an ink jet recording method with which an image to be formed on a recording medium by means of the above ink jet ink that does not undergo color fading owing to light and an environmental gas can be obtained.

Another object of the present invention is to provide an ink cartridge, a recording unit, and an ink jet recording apparatus each using the above ink jet ink.

The above objects are achieved by the present invention described below. That is, according to one aspect of the present invention, there is provided an ink jet yellow ink to be used for forming an image together with a cyan ink comprising one of a compound represented by the following general formula (1) and a compound represented by the following general formula (2) as a coloring material, the ink jet yellow ink comprising: at least one kind of coloring material selected from the following A group; and at least one kind of coloring material selected from the following B group;

A group: C.I. Direct Yellow 132 and C.I. Direct Yellow 173
B group: C.I. Direct Yellow 142, C.I. Direct Yellow 86, and a compound represented by the following general formula (3);

General formula (1):

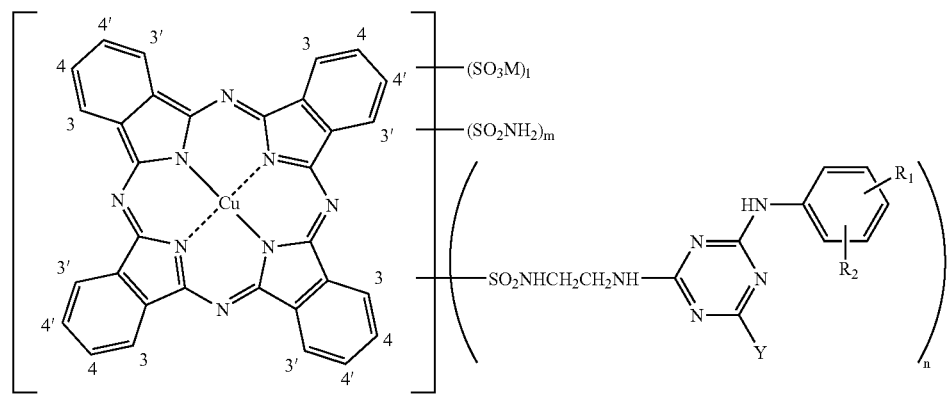

wherein M represents an alkali metal or ammonium; $R_1$ and $R_2$ each independently represent a hydrogen atom, a sulfonic group, or a carboxyl group (provided that $R_1$ and $R_2$ are not simultaneously a hydrogen atom); Y represents a chlorine atom, a hydroxyl group, an amino group, or a monoalkylamino or dialkylamino group; l represents 0 to 2, m represents 1 to 3, and n represents 1 to 3 (provided that l+m+n=3 to 4); and positions at which substituent are present are the 4- or 4'-positions;

General formula (2):

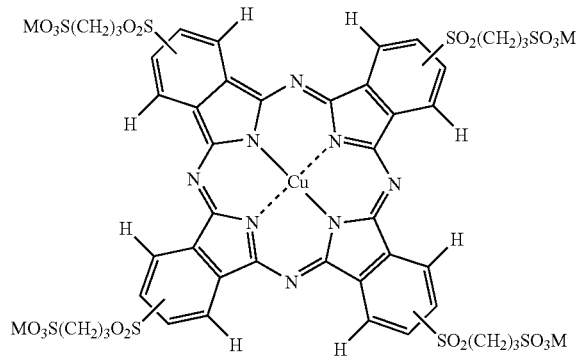

wherein M represents a hydrogen atom, an alkali metal, ammonium, or an organic ammonium;

General formula (3):

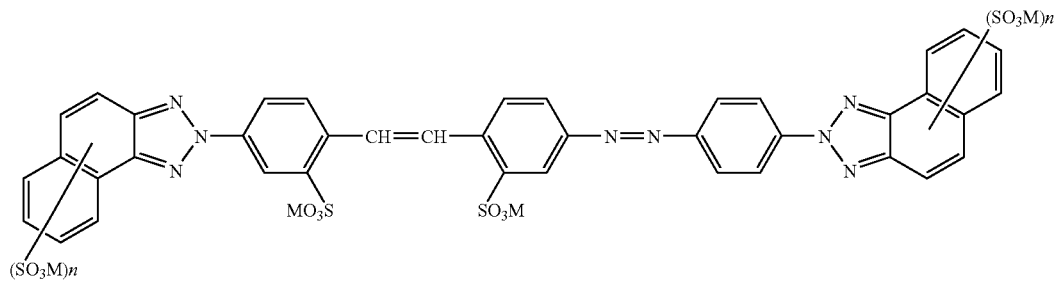

wherein M's each independently represent a hydrogen atom, an alkali metal, an alkali earth metal, a cation of organic amine or an ammonium ion, and n's each independently represent 1 or 2.

According to another aspect of the present invention, there is provided an ink jet yellow ink to be used for forming an image together with a magenta ink comprising one of a compound represented by the following general formula (4) or a salt thereof as a coloring material, the ink jet yellow ink comprising: at least one kind of coloring material selected from the following A group; and at least one kind of coloring material selected from the following B group;

A group: C.I. Direct Yellow 132 and C.I. Direct Yellow 173
B group: C.I. Direct Yellow 142, C.I. Direct Yellow 86, and a compound represented by the following general formula: (3);

General formula (3):

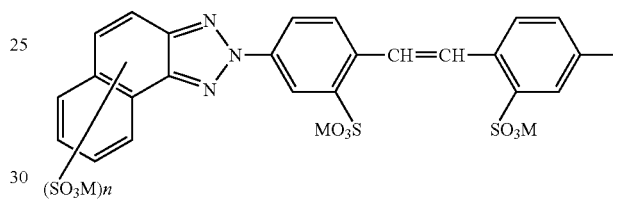

General formula (4):

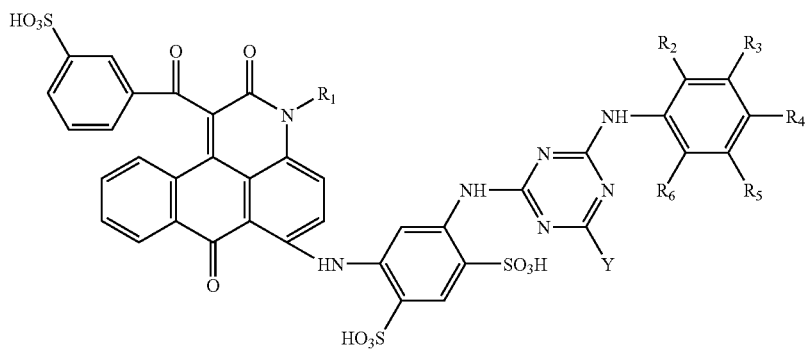

wherein $R_1$ represents a hydrogen atom, an alkyl group, a hydroxy lower alkyl group, a cyclohexyl group, a monoalkyl aminoalkyl or dialkyl aminoalkyl group, or a cyano lower alkyl group; Y represents a chlorine atom, a hydroxyl group, an amino group, or a monoalkylamino or dialkylamino group which may have a substituent selected from the group consisting of a sulfonic group, a carboxylgroup, and a hydroxyl group on an alkyl group; and $R_2$, $R_3$, $R_4$, $R_5$, and $R_6$ each independently represent a hydrogen atom, an alkyl group having 1 to 8 carbon atoms, or a carboxyl group (provided that $R_2$, $R_3$, $R_4$, $R_5$, and $R_6$ are not simultaneously a hydrogen atom);

-continued

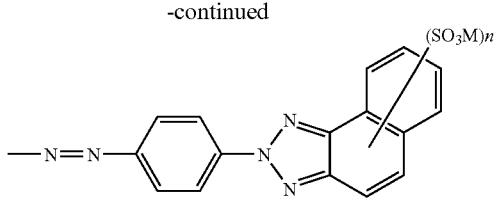

wherein M's each independently represent a hydrogen atom, an alkali metal, an alkali earth metal, a cation of organic amine or an ammonium ion, and n's each independently represent 1 or 2.

According to another aspect of the present invention, there is provided an ink jet yellow ink to be used for forming an image together with an ink jet cyan ink comprising one of a compound represented by the following general formula (1) and a compound represented by the following general formula (2) as a coloring material and with an ink jet magenta ink comprising at least one of a compound represented by the following general formula (4) or a salt thereof as a coloring material, the ink jet yellow ink comprising: at least one kind of coloring material selected from the following A group; and at least one kind of coloring material selected from the following B group;

A group: C.I. Direct Yellow 132 and C.I. Direct Yellow 173

B group: C.I. Direct Yellow 142, C.I. Direct Yellow 86, and a compound represented by the following general formula (3);

General formula (1):

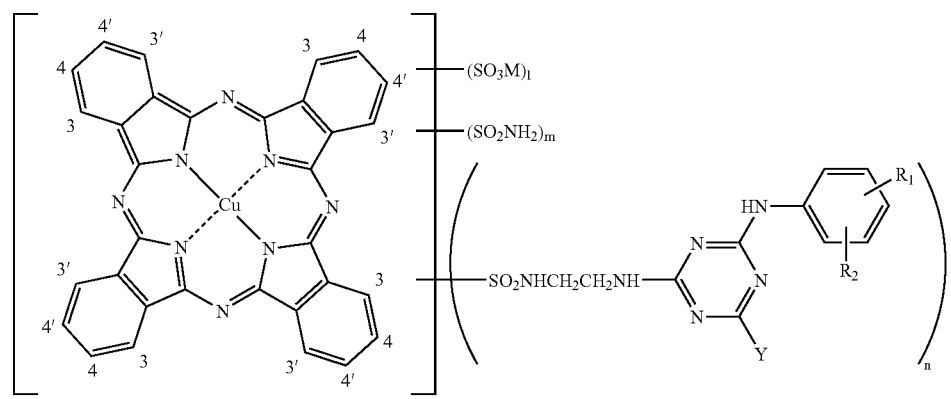

wherein M represents an alkali metal or ammonium; $R_1$ and $R_2$ each independently represent a hydrogen atom, a sulfonic group, or a carboxyl group (provided that $R_1$ and $R_2$ are not simultaneously a hydrogen atom); Y represents a chlorine atom, a hydroxyl group, an amino group, or a monoalkylamino or dialkylamino group; l represents 0 to 2, m represents 1 to 3, and n represents 1 to 3 (provided that l+m+n=3 to 4); and positions at which substituents are present are the 4- or 4'-positions;

General formula (2):

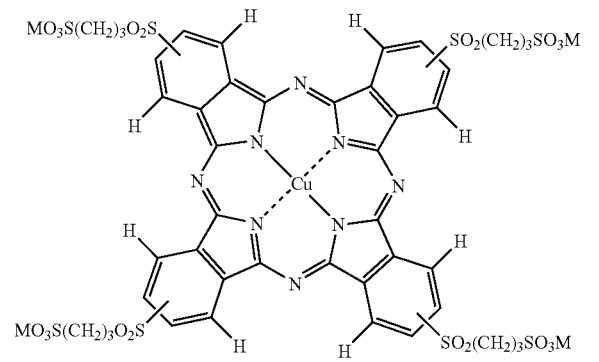

wherein M represents a hydrogen atom, an alkali metal, ammonium, or an organic ammonium;

General formula (3):

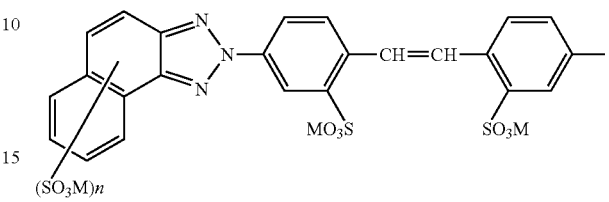

-continued

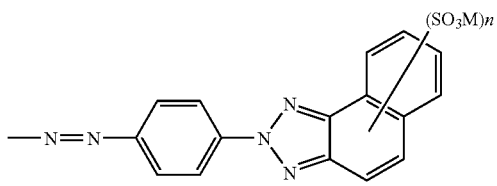

wherein M's each independently represent a hydrogen atom, an alkali metal, an alkali earth metal, a cation of organic amine or an ammonium ion, and n's each independently represent 1 or 2;

General formula (4):

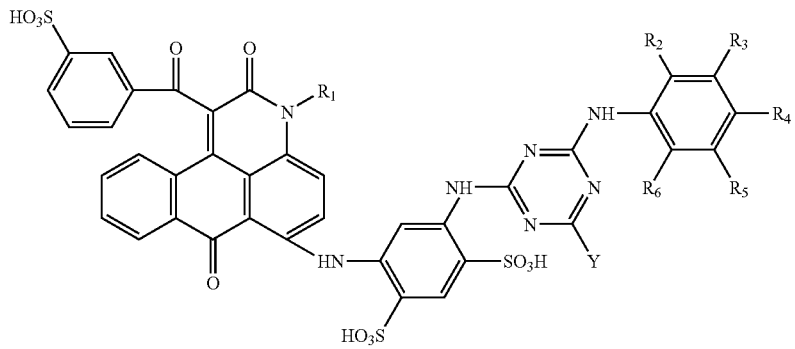

wherein $R_1$ represents a hydrogen atom, an alkyl group, a hydroxy lower alkyl group, a cyclohexyl group, a monoalkyl aminoalkyl or dialkyl aminoalkyl group, or a cyano lower alkyl group; Y represents a chlorine atom, a hydroxyl group, an amino group, or a monoalkylamino or dialkylamino group (which may have a substituent selected from the group consisting of a sulfonic group, a carboxyl group, and a hydroxyl group on an alkyl group); and $R_2$, $R_3$, $R_4$, $R_5$, and $R_6$ each independently represent a hydrogen atom, an alkyl group having 1 to 8 carbon atoms, or a carboxyl group (provided that $R_2$, $R_3$, $R_4$, $R_5$, and $R_6$ are not simultaneously a hydrogen atom).

According to another aspect of the present invention, there is provided an ink set composed of multiple inks comprising at least: an ink jet cyan ink comprising one of a compound represented by the following general formula (1) and a compound represented by the following general formula (2) as a coloring material; and an ink jet yellow ink comprising at least one kind of coloring material selected from the following A group and at least one kind of coloring material selected from the following B group;

A group: C.I. Direct. Yellow 132 and C.I. Direct Yellow 173
B group: C.I. Direct Yellow 142, C.I. Direct Yellow 86, and a compound represented by the following general formula (3);

wherein M represents an alkali metal or ammonium; $R_1$ and $R_2$ each independently represent a hydrogen atom, a sulfonic group, or a carboxyl group (provided that $R_1$ and $R_2$ are not simultaneously a hydrogen atom); Y represents a chlorine atom, a hydroxyl group, an amino group, or a monoalkylamino or dialkylamino group; l represents 0 to 2, m represents 1 to 3, and n represents 1 to 3 (provided that l+m+n=3 to 4); and positions at which substituents are present are 4- or 4'-positions;

General formula (2)

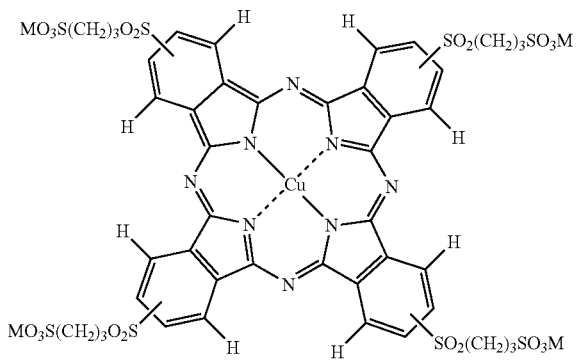

General formula (1):

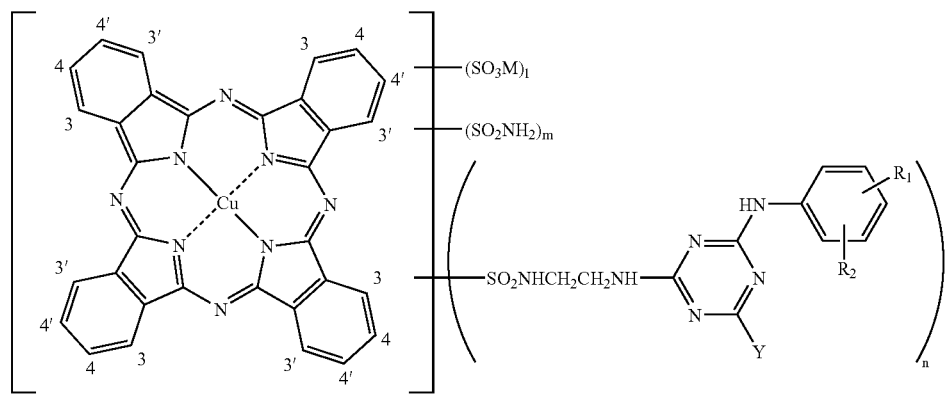

wherein M represents a hydrogen atom, an alkali metal, ammonium, or an organic ammonium;

General formula (3):

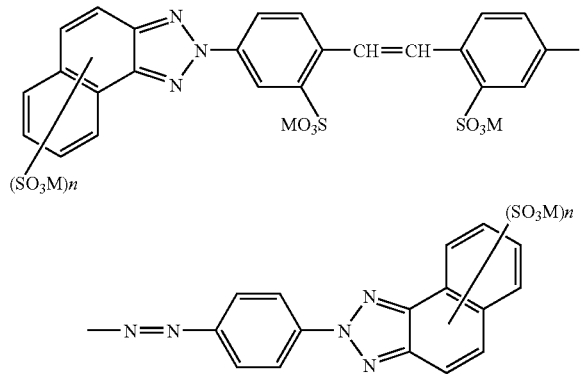

wherein M's each independently represent a hydrogen atom, an alkali metal, an alkali earth metal, a cation of organic amine or an ammonium ion, and n's each independently represent 1 or 2.

According to another aspect of the present invention, there is provided an ink set composed of multiple inks comprising at least an ink jet magenta ink comprising one of a compound represented by the following general formula (4) or a salt thereof as a coloring material; and an ink jet yellow ink comprising at least one kind of coloring material selected from the following A group and at least one kind of coloring material selected from the following B group;
A group: C.I. Direct Yellow 132 and C.I. Direct Yellow 173
B group: C.I. Direct Yellow 142, C.I. Direct Yellow 86, and a compound represented by the following general formula (3);

a hydroxyl group on an alkyl group); and $R_2$, $R_3$, $R_4$, $R_5$, and $R_6$ each independently represent a hydrogen atom, an alkyl group having 1 to 8 carbon atoms, or a carboxyl group (provided that $R_2$, $R_3$, $R_4$, $R_5$, and $R_6$ are not simultaneously a hydrogen atom);

General formula (3):

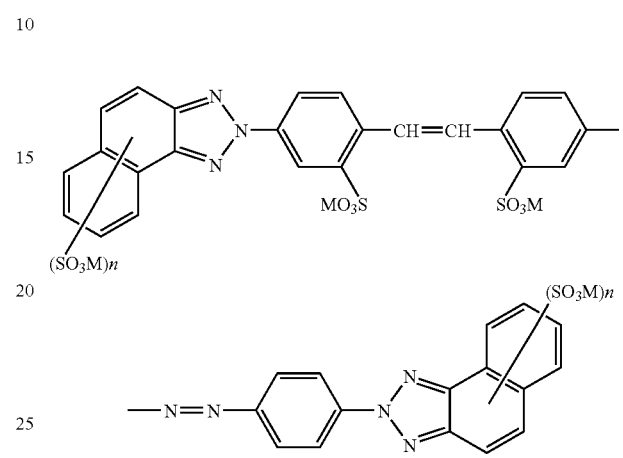

wherein M's each independently represents a hydrogen atom, an alkali metal, an alkali earth metal, a cation of organic amine or an ammonium ion, and n's each independently represent 1 or 2.

According to another aspect of the present invention, there is provided an ink set composed of multiple inks comprising at least: an ink jet cyan ink comprising one of a compound represented by the following general formula (1) and a compound represented by the following general formula (2) as a coloring material; an ink jet magenta ink comprising one of a compound represented by the following general formula (4) or a salt thereof as a coloring material; and an ink jet yellow ink comprising at least one kind of General formula (4):

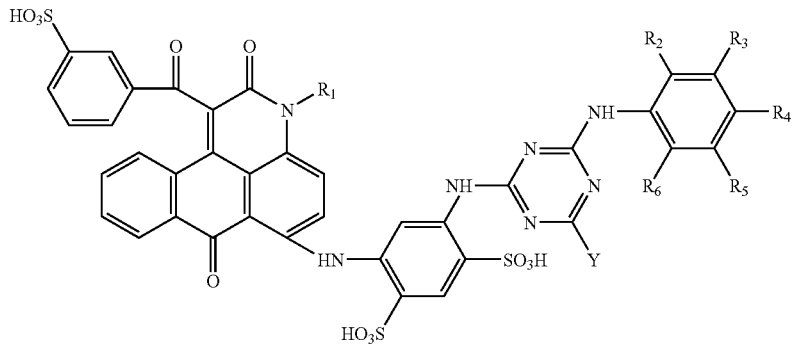

wherein $R_1$ represents a hydrogen atom, an alkyl group, a hydroxy lower alkyl group, a cyclohexyl group, a monoalkyl aminoalkyl or dialkyl aminoalkyl group, or a cyano lower alkyl group; Y represents a chlorine atom, a hydroxyl group, an amino group, or a monoalkylamino or dialkylamino group (which may have a substituent selected from the group consisting of a sulfonic group, a carboxyl group, and coloring material selected from the following A group and at least one kind of coloring material selected from the following B group;
A group: C.I. Direct Yellow 132 and C.I. Direct Yellow 173
B group: C.I. Direct Yellow 142, C.I. Direct Yellow 86, and a compound, represented by the following general formula (3);

General formula (1):

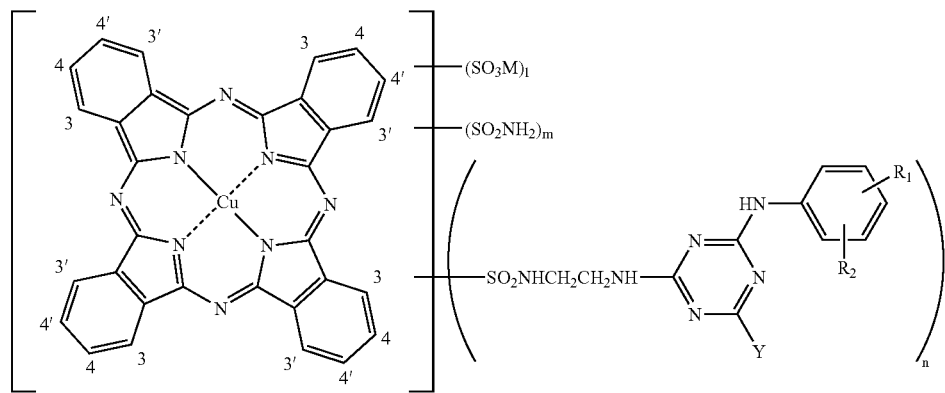

wherein M represents an alkali metal or ammonium; $R_1$ and $R_2$ each independently represent a hydrogen atom, a sulfonic group, or a carboxyl group (provided that $R_1$ and $R_2$ are not simultaneously a hydrogen atom); Y represents a chlorine atom, a hydroxyl group, an amino group, or a monoalkylamino or dialkylamino group; l represents 0 to 2, m represents 1 to 3, and n represents 1 to 3 (provided that l+m+n=3 to 4); and positions at which substituents are present are the 4- or 4'-positions;

General formula (2):

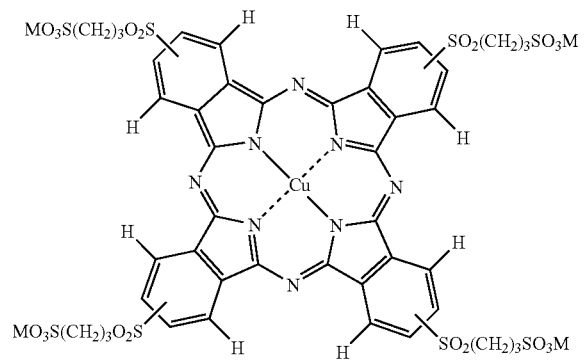

wherein M represents a hydrogen atom, an alkali metal, ammonium, or an organic ammonium;

General formula (3):

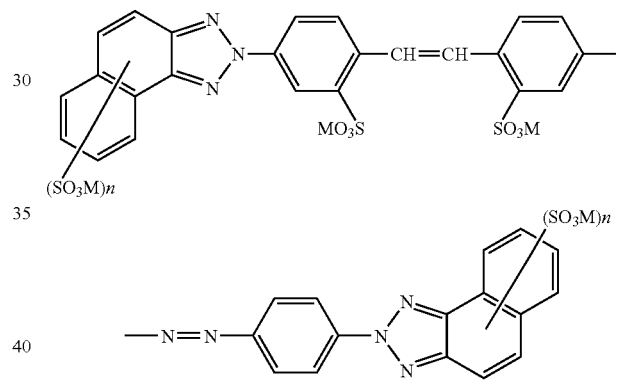

wherein M's each independently represent a hydrogen atom, an alkali metal, an alkali earth metal, a cation of organic amine or an ammonium ion, and n's each independently represent 1 or 2;

General formula (4):

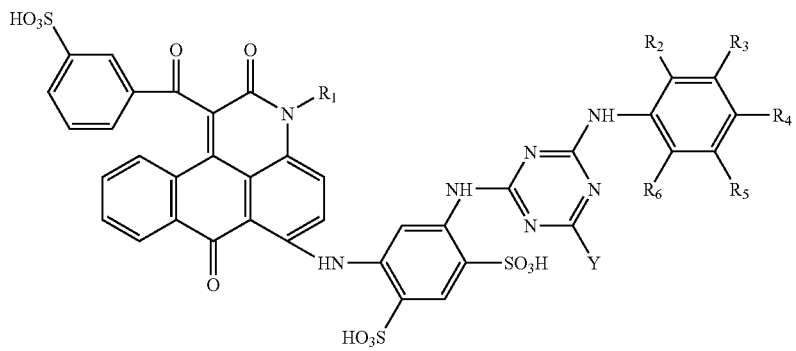

wherein $R_1$ represents a hydrogen atom, an alkyl group, a hydroxy lower alkyl group, a cyclohexyl group, a monoalkyl aminioalkyl or dialkyl aminoalkyl group, or a cyano lower alkyl group; Y represents a chlorine atom, a hydroxyl group, an amino group, or a monoalkylamino or dialkylamino group (which may have a substituent selected from the group consisting of a sulfonic group, a carboxyl group, and a hydroxyl group on an alkyl group); and $R_2$, $R_3$, $R_4$, $R_5$, and $R_6$ each independently represent a hydrogen atom, an alkyl group having 1 to 8 carbon atoms, or a carboxyl group (provided that $R_2$, $R_3$, $R_4$, $R_5$, and $R_6$ are not simultaneously a hydrogen atom).

According to another aspect of the present invention, there is provided an ink jet recording method, including ejecting an ink by an ink jet method to perform recording on a recording medium, in which the ink is the ink jet yellow ink having the above constitution.

According to another aspect of the present invention, there is provided an ink cartridge, including an ink storage portion for storing ink, in which the ink is the ink jet yellow ink having the above constitution.

According to another aspect of the present invention, there is provided an ink cartridge, including an ink storage portion for storing an ink set composed of multiple inks, in which the ink set is the ink set having the above constitution.

According to another aspect of the present invention, there is provided a recording unit, including an ink storage portion for storing ink and a recording head for ejecting the ink, in which the ink is the ink jet yellow ink having the above constitution.

According to another aspect of the present invention, there is provided an ink jet recording apparatus, including an ink storage portion for storing ink and a recording head for ejecting the ink, in which the ink is the ink jet ink having the above constitution.

According to the present invention, there can be provided an ink jet yellow ink to be used in combination with an ink jet cyan ink containing a specific coloring material excellent in light resistance and environmental gas resistance with a color fading balance with respect to light and an environmental gas between the yellow ink and the cyan ink uniformized.

According to another aspect of the present invention, there can be provided an ink jet yellow ink to be used in combination with an ink jet magenta ink containing a specific coloring material excellent in light resistance and environmental gas resistance with a color fading balance with respect to light and an environmental gas between the yellow ink and the magenta ink uniformized.

According to another aspect of the present invention, there can be provided an ink jet yellow ink to be used in combination with an ink jet magenta ink and an ink jet cyan ink each containing a specific coloring material with a color fading balance with respect to light and an environmental gas among the three color inks uniformized.

According to another aspect of the present invention, there can be provided an ink set containing at least an ink jet magenta ink, an ink jet cyan ink, and an ink jet yellow ink each containing a specific coloring material with a color fading balance with respect to light and an environmental gas among the three color inks uniformized.

According to another aspect of the present invention, there can be provided an ink jet recording method with which an image to be formed on a recording medium by means of the above ink jet ink that does not undergo color fading owing to light and an environmental gas can be obtained.

According to another aspect of the present invention, there can be provided an ink cartridge, a recording unit, and an ink jet recording apparatus each using the above ink jet ink.

DESCRIPTION OF THE PREFERRED EMBODIMENTS

Figure 1:
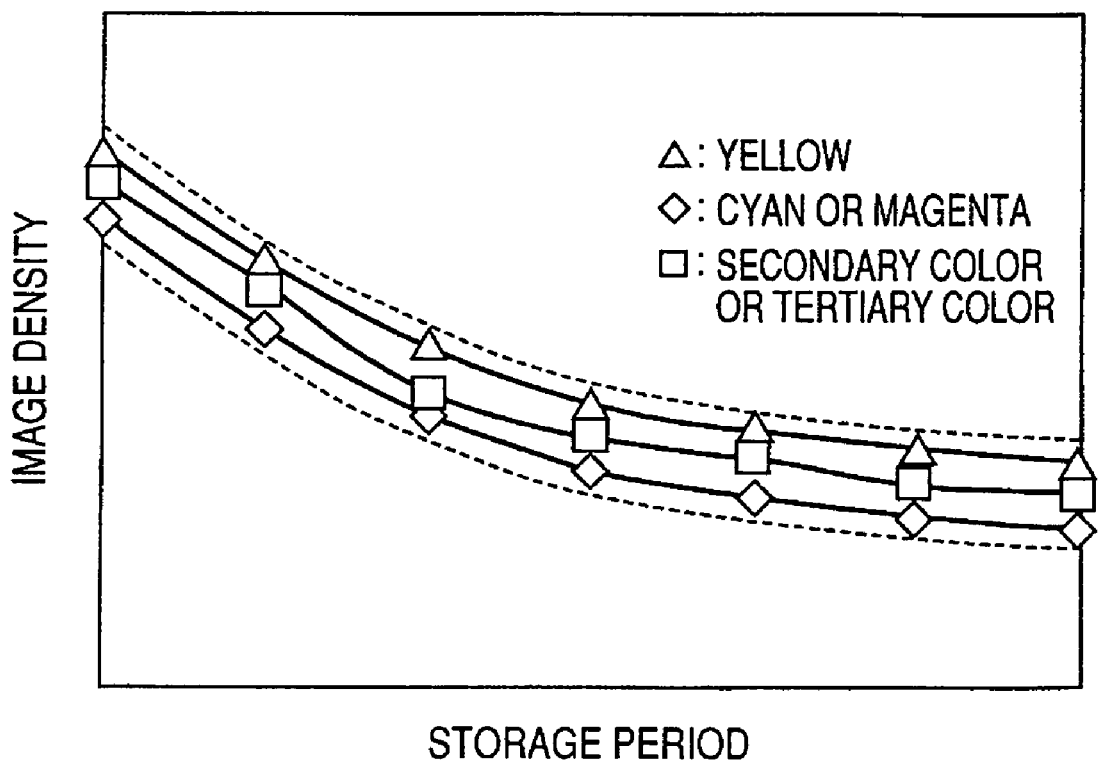
FIG. 1 shows an image of the deterioration of an image density with time.

Hereinafter, the present invention will be described in more detail by way of preferred embodiments.

In the present invention, when a compound is a salt, the salt is dissociated to ions in ink, but this state is represented by using the phrase "contains a salt" for convenience. Further, ink jet ink may hereinafter be simply referred to as the "ink".

(Ink)

Hereinafter, components constituting the ink according to the present invention and the like will be described in detail.

(Coloring Material of Yellow Ink)

As described above, the yellow ink according to the present invention is requested to have the degree of color fading with respect to an environmental gas and light comparable to that of each of a cyan ink and a magenta ink. In the present invention, a coloring material is selected in such a manner that a yellow ink has high light resistance and shows environmental gas resistance comparable to that of each of a magenta ink and a cyan ink. Such coloring materials as listed above to be used as coloring materials of yellow inks show the same light resistance, but are different from each other in environmental gas resistance. To be specific, a coloring material belonging to the A group to be used alone shows higher environmental gas resistance than that of each of a magenta ink and a cyan ink to be described later, while a coloring material belonging to the B group to be used alone shows lower environmental gas resistance than that of a cyan ink to be described later. Accordingly, environmental gas resistance comparable to that of each of a magenta ink and a cyan ink to be described later can be obtained by: selecting at least one kind of coloring material from the A group and at least one kind of coloring material from the B group; and mixing the selected coloring materials at a preferable ratio. Thus, a yellow ink excellent in color fading balance can be obtained.

The yellow ink according to the present invention must be prepared by using in combination at least one kind of coloring material selected from the compounds described in the A group and at least one kind of coloring material selected from the compounds described in the B group.

A group: C.I. Direct Yellow 132 and C.I. Direct Yellow 173

B group: C.I. Direct Yellow 142, C.I. Direct Yellow 86, and a compound represented by the following general formula (3)

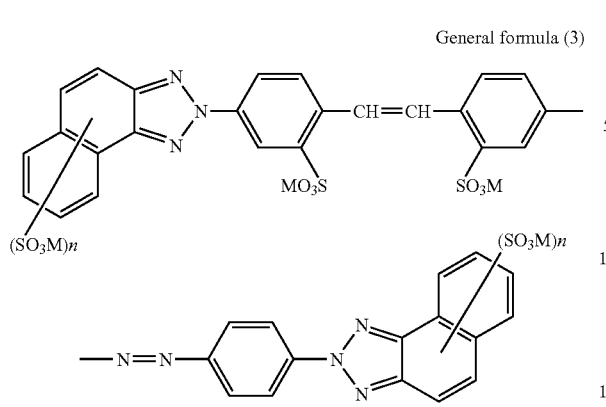

General formula (3)

(In the general formula (3), M's each independently represent a hydrogen atom, an alkali metal, an alkali earth metal, a cation of organic amine or an ammonium ion, and n's each independently represent 1 or 2.)

Specific examples of the coloring material represented by the general formula (3) include compounds having the structures shown in Table 1 below. Of course, the present invention is not limited to them. In Table 1, for convenience, the substitution position of a sulfonic group is represented as a position in an A ring or a B ring as shown in the following general formula (5). The substitution position of a sulfonic group is as defined in the following general formula (5).

a cation of organic amine or ammonium ion, and n's each independently represent 1 for 2.)

TABLE 1

| | | Position of substituent | |
|---|---|---|---|
| | | A ring | B ring |
| Exemplified Compound | Y1 | 2 | 4 |
| | Y2 | 4 | 4 |
| | Y3 | 2 | 4, 6 |
| | Y4 | 4, 6 | 4 |

A preferable specific example of the coloring material represented by the general formula (5) includes Exemplified Compound Y1 below. Of course, the present invention is not limited thereto.

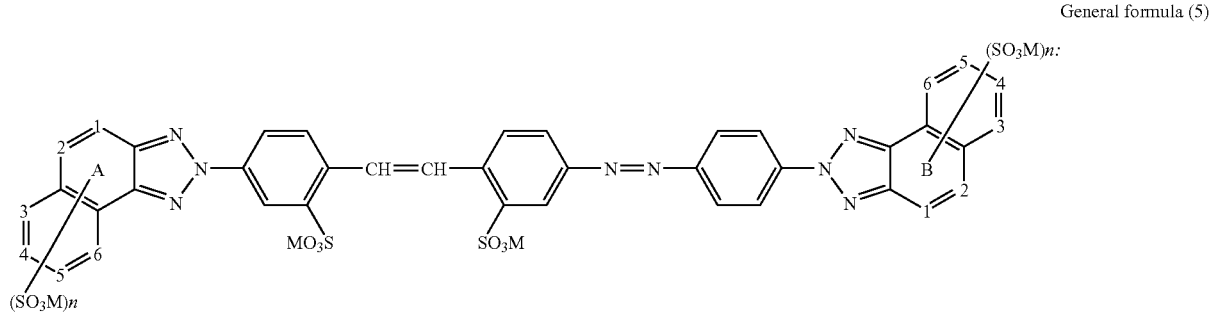

General formula (5)

(In the general formula (5), M's each independently represent a hydrogen atom, an alkali metal, an alkali earth metal,

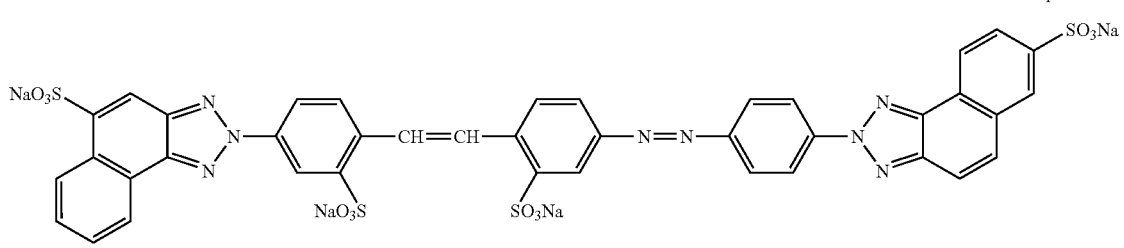

Exemplified Compound Y1

The content (mass %) of the coloring material in the yellow ink is preferably 1.0 mass % or more and 10.0 mass % or less, or more preferably 1.5 mass % or more and 6.0 mass % or less with respect to the total mass of the ink. A content of less than 1.0 mass % may not sufficiently provide the effects of the present invention such as a color fading balance, while a content in excess of 10.0 mass % may not provide ink jet properties such as anti-sticking property. In addition, a ratio (%) between the content (mass %) of the coloring material belonging to the A group and the content (mass %) of the coloring material belonging to the B group in the yellow ink (the content (mass %) of the coloring material belonging to the A group: the content (mass %) of the coloring material belonging to the B group) is preferably 1:10 to 10:1. This is because a ratio in the above range effectively provides an excellent color fading balance as one of the effects of the present invention.

(Coloring Material of Magenta Ink)

The magenta ink according to the present invention is requested to have high light resistance and to show environmental gas resistance comparable to that of the above yellow ink. Therefore, a compound represented by the following general formula (4) or a salt thereof is preferably used as a coloring material of the magenta ink. Each of the coloring materials to be used as a coloring material of the magenta ink shows high light resistance, but its environmental gas resistance to an ozone gas alone in an environmental gas is different from its environmental gas resistance to a mixed gas containing an ozone gas and an acid gas such as $NO_x$ or $SO_2$. To be specific, each coloring material shows low resistance to an ozone gas alone, but shows high resistance to a mixed gas containing an ozone gas and an acid gas.

General formula (4)

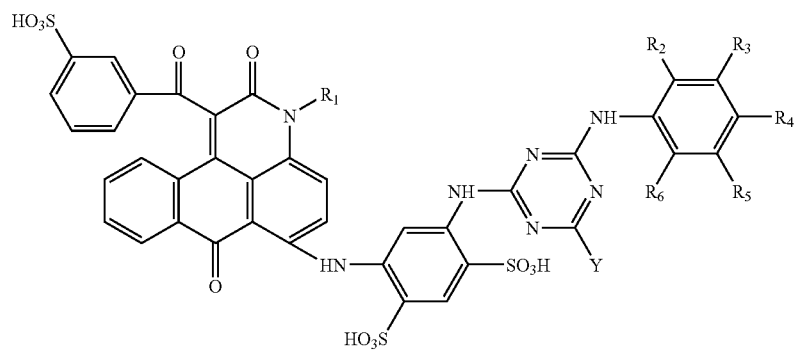

(In the general formula (4): $R_1$ represents a hydrogen atom, an alkyl group, a hydroxy lower alkyl group, a cyclohexyl group, a monoalkyl aminoalkyl or dialkyl aminoalkyl group, or a cyano lower alkyl group; Y represents a chlorine atom, a hydroxyl group, an amino group, or a monoalkylamino or dialkylamino group (which may have a substituent selected from the group consisting of a sulfonic group, a carboxyl group, and a hydroxyl group on an alkyl group); and $R_2$, $R_3$, $R_4$, $R_5$, and $R_6$ each independently represent a hydrogen atom, an alkyl group having 1 to 8 carbon atoms, or a carboxyl group (provided that $R_2$, $R_3$, $R_4$, $R_5$, and $R_6$ are not simultaneously a hydrogen atom).)

Preferable specific examples of the compound represented by the general formula (4) include Exemplified Compounds M1 to M7 below. Of course, the present invention is not limited thereto.

Exemplified Compounds M1 to M7

Exemplified compound M1

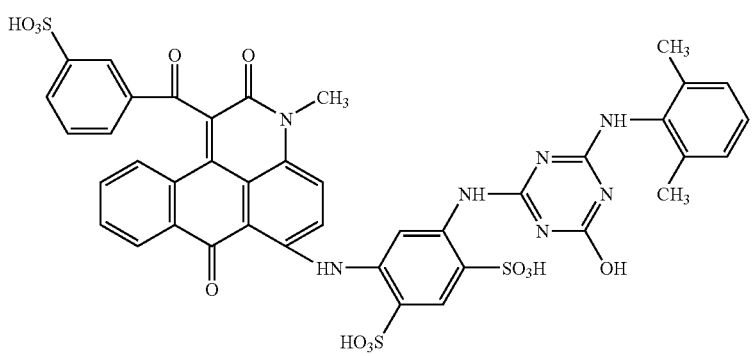

-continued
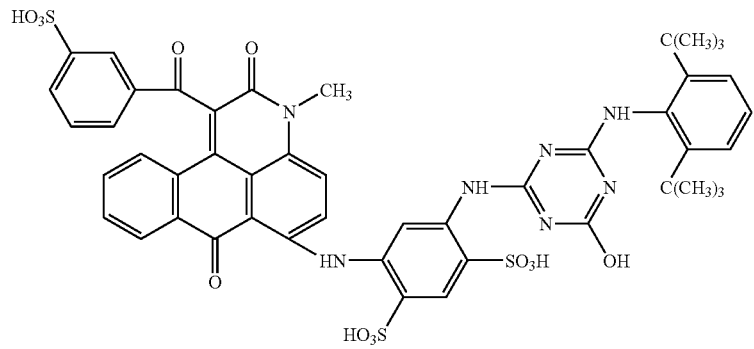
Exemplified compound M2
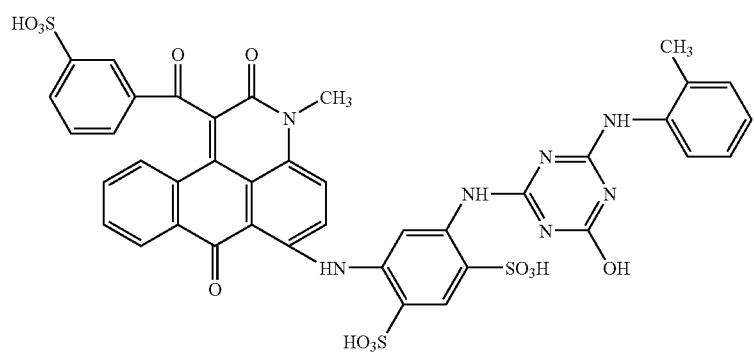
Exemplified compound M3
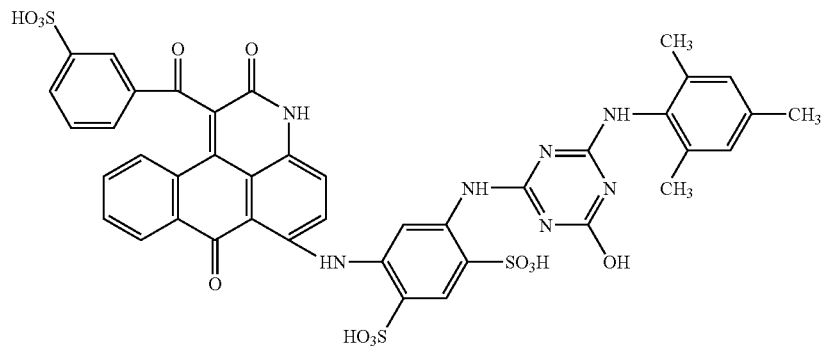
Exemplified compound M4
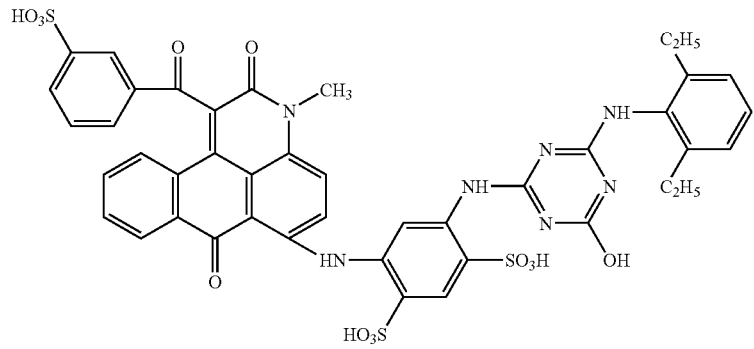
Exemplified compound M5

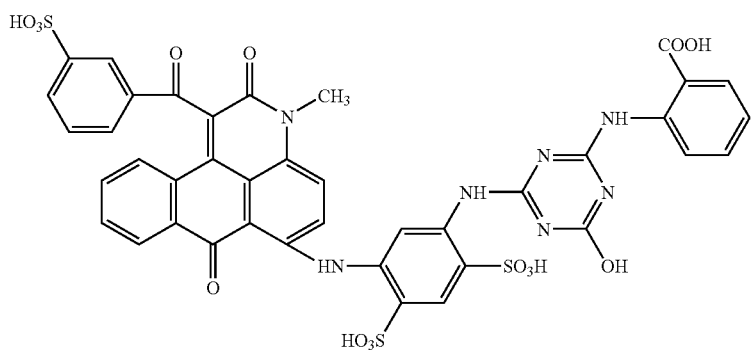

Exemplified compound M6

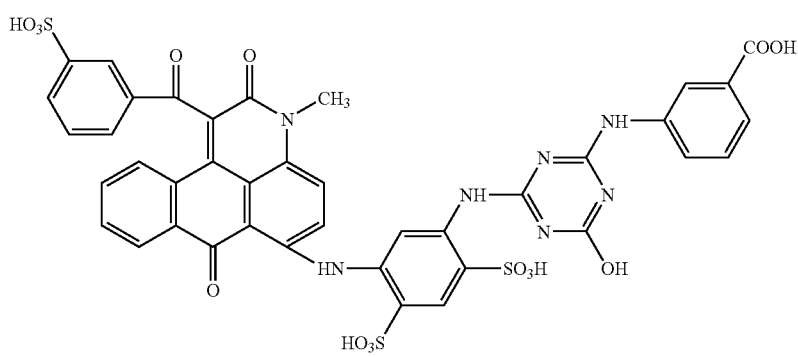

Exemplified compound M7

The content (mass %) of the coloring material in the magenta ink is preferably 1.0 mass % or more and 10.0 mass % or less, or more preferably 1.5 mass % or more and 6.0 mass % or less with respect to the total mass of the ink. A content of less than 1.0 mass % may not sufficiently provide the effects of the present invention such as a color fading balance, while a content in excess of 10.0 mass % may not provide ink jet properties such as anti-sticking property.

(Coloring Material of Cyan Ink)

The cyan ink according to the present invention is requested to have high environmental gas resistance comparable to that of each of the yellow ink and the magenta ink. Therefore, a compound represented by the following general formula (1) or a compound represented by the following general formula (2) is preferably used as a coloring material of the cyan ink. It should be noted that only one kind selected from the compounds each represented by the general formula (1) or (2) may be used, or two or more kinds selected therefrom may be used in combination.

General formula (1)

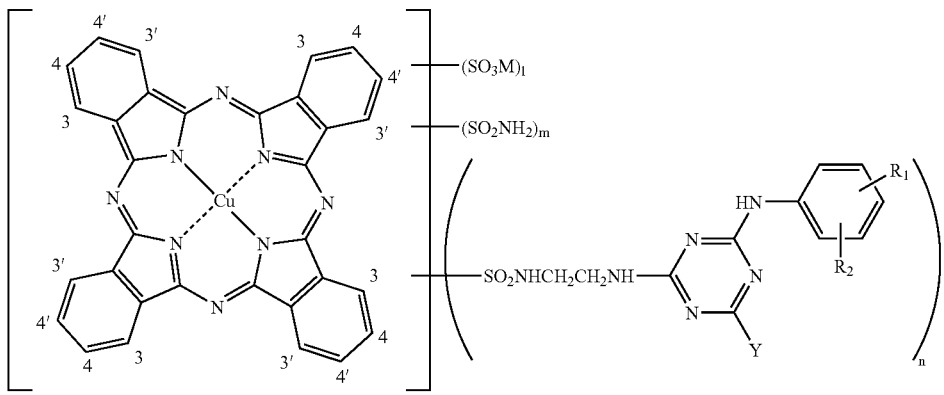

(In the general formula (1): M represents an alkali metal or ammonium; $R_1$ and $R_2$ each independently represent a hydrogen atom, a sulfonic group, or a carboxyl group (provided that $R_1$ and $R_2$ are not simultaneously a hydrogen atom); Y represents a chlorine atom, a hydroxyl group, an amino group, or a monoalkylamino or dialkylamino group; l represents 0 to 2, m represents 1 to 3, and n represents 1 to 3 (provided that l+m+n=3 to 4); and positions at which substituent are present are the 4- or 4'-positions.)

The coloring material to be used in the present invention is a phthalocyanine derivative prepared by selectively introducing an unsubstituted sulfamoyl group (—SO$_2$NH$_2$) or a substituted sulfamoyl group (a group represented by the following general formula (6)) to each of only 4- and 4'-positions in the general formula (1). The inventors of the present invention have found that a recorded article obtained by means of ink containing such compound is extremely excellent in environmental gas resistance.

A phthalocyanine compound prepared by reacting a 4-sulfophthalic acid derivative, or a 4-sulfophthalic acid derivative and phthalic acid (anhydride) derivative, in the presence of a metal compound is used as a raw material for synthesizing a compound represented by the general formulae (1) or a salt thereof. A sulfonic group in the phthalocyanine compound is transformed into a chlorosulfonic group, and then an amination agent is allowed to react with the resultant in the presence of an organic amine to synthesize the compound or the salt thereof.

General formula (6)

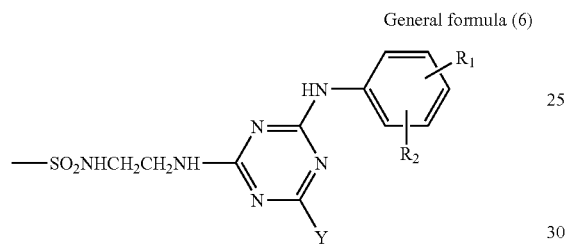

Preferable specific examples of the substituted sulfamoyl group represented by the general formula (6) are shown below. Of course, the substituted sulfamoyl group used in the present invention is not limited thereto. The substituted sulfamoyl group represented by the general formula (6) is shown in the form of a free acid. Of those, a compound substituted by Exemplified Substituent 1 is most preferable because of its balance between color developability and environmental gas resistance.

Exemplified Substituents 1 to 7

Exemplified Substituent 1

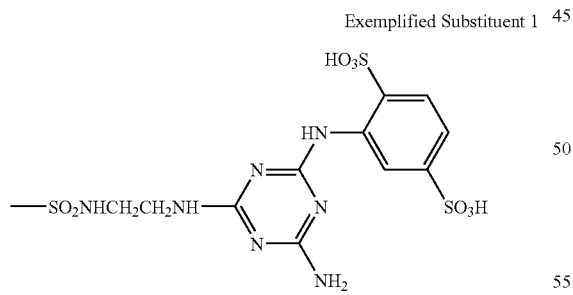

Exemplified Substituent 2

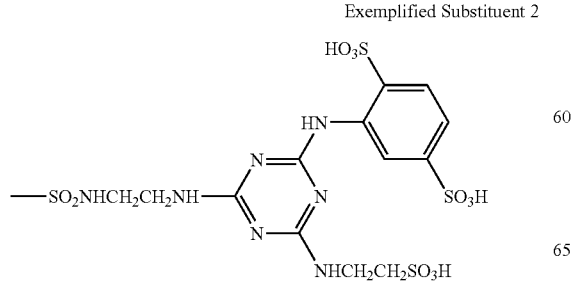

-continued

Exemplified Substituent 3

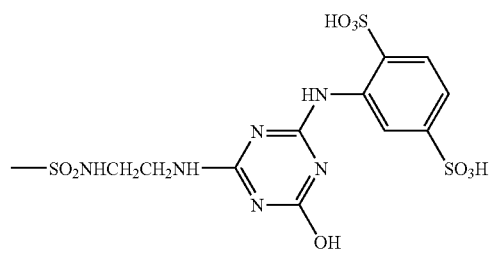

Exemplified Substituent 4

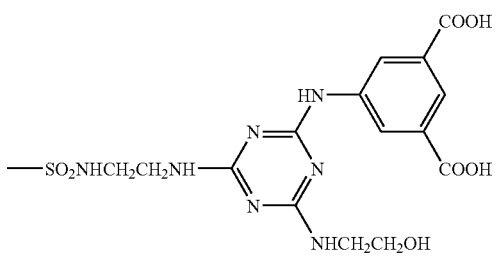

Exemplified Substituent 5

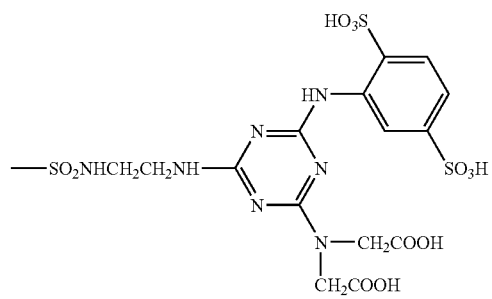

Exemplified Substituent 6

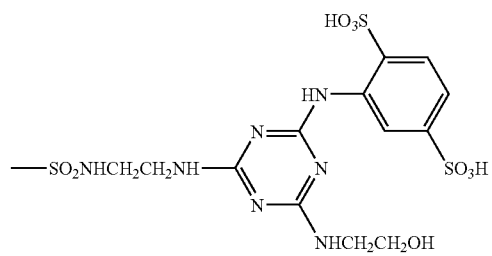

Exemplified Substituent 7

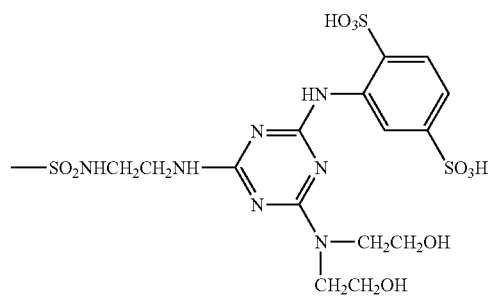

General formula (2)

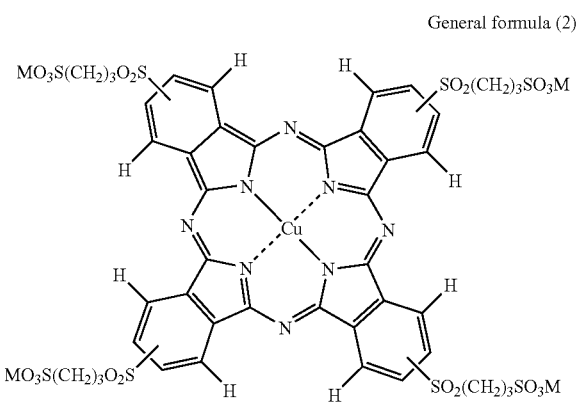

(In the general formula (2), M represents a hydrogen atom, an alkali metal, ammonium, or an organic ammonium.)

The content (mass %) of the coloring material in the cyan ink is preferably 1.0 mass % or more and 10.0 mass % or less, or more preferably 1.5 mass % or more and 6.0 mass % or less with respect to the total mass of the ink. A content of less than 1.0 mass % may not sufficiently provide the effects of the present invention such as a color fading balance, while a content in excess of 10.0 mass % may not provide ink jet properties such as anti-sticking property.

(Coloring Materials of Other Inks)

Each of the yellow ink according to the present invention, and the magenta ink and the cyan ink to be used in combination with the yellow ink may contain another coloring material as well as the above coloring material. Specific examples of the other coloring material are shown below. Of course, the present invention is not limited thereto.

The content (mass %) of the other coloring material to be incorporated into each of the yellow ink according to the present invention, and the magenta ink and the cyan ink to be used in combination with the yellow ink is as follows.

For the yellow ink, a ratio of the content of a coloring material except those belonging to the A and B groups to the total content of the coloring materials is preferably less than 20%. For the magenta ink, a ratio of the content of a coloring material except the compound represented by the general formula (4) or the salt thereof to the total content of the coloring materials is preferably less than 20%. For the cyan ink, a ratio of the content of a coloring material except the compound represented by the general formula (1) or the compound represented by the general formula (2) to the total content of the coloring materials is preferably less than 20%. The above contents are preferable because a color fading balance as one of the effects of the present invention becomes excellent.

The yellow ink according to the present invention may be used in combination with another ink as well as the magenta ink and the cyan ink described above. Specific examples of a coloring material to be incorporated into ink that can be used in combination with the yellow ink according to the present invention are shown below. Of course, the present invention is not limited thereto.

(Yellow Coloring Material)
C.I. Direct Yellow: 8, 11, 12, 27, 28, 33, 39, 44, 50, 58, 85, 86, 87, 88, 89, 98, 100, 110, 132, and 173
C.I. Acid Yellow: 1, 3, 7, 11, 17, 23, 25, 29, 36, 38, 40, 42, 44, 76, 98, and 99
C.I. Pigment Yellow: 1, 2, 3, 12, 13, 14, 15, 16, 17, 73, 74, 75, 83, 93, 95, 97, 98, 114, 128, 138, and 180
(Magenta Coloring Material)
C.I. Direct Red: 2, 4, 9, 11, 20, 23, 24, 31, 39, 46, 62, 75, 79, 80, 83, 89, 95, 197, 201, 218, 220, 224, 225, 226, 227, 228, 229, and 230
C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, and 289
C.I. Food Red: 87, 92, and 94
C.I. Direct Violet: 107
C.I. Pigment Red: 2, 5, 7, 12, 48:2, 48:4, 57:1, 112, 122, 123, 168, 184, and 202
(Cyan Coloring Material)
C.I. Direct Blue: 1, 15, 22, 25, 41, 76, 77, 80, 86, 90, 98, 106, 108, 120, 158, 163, 168, 199, 226, and 307.
C.I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221, and 244
C.I. Pigment Blue: 1, 2, 3, 15, 15:2, 15:3, 15:4, 16, 22, and 60

(Coloring Materials Having Other Color Tones)

The yellow ink according to the present invention may be used in combination with so-called special color inks such as black, red, green, and blue inks as required as well as the above inks. Examples of coloring materials that can be incorporated into those inks are shown below. Of course, the present invention is not limited thereto.

C.I. Acid Orange: 7, 8, 10, 12, 24, 33, 56, 67, 74, 88, 94, 116, and 142
C.I. Acid Red: 11, 114, 266, and 374
C.I. Direct Orange: 26, 29, 34, 39, 57, 102, and 118
C.I. Food Orange: 3
C.I. Reactive Orange: 1, 4, 5, 7, 12, 13, 14, 15, 16, 20, 29, 30, 84, and 107
C.I. Disperse Orange: 1, 3, 11, 13, 20, 25, 29, 30, 31, 32, 47, 55, and 56
C.I. Pigment Orange: 43
C.I. Pigment Red: 122, 170, 177, 194, 209, and 224
C.I. Acid Green: 1, 3, 5, 6, 9, 12, 15, 16, 19, 21, 25, 28, 81, and 84
C.I. Direct Green: 26, 59, and 67
C.I. Food Green: 3
C.I. Reactive Green: 5, 6, 12, 19, and 21
C.I. Disperse Green: 6 and 9
C.I. Pigment Green: 7 and 36
C.I. Acid Blue: 62, 80, 83, 90, 104, 112, 113, 142, 203, 204, 221, and 244
C.I. Reactive Blue: 49
C.I. Acid Violet: 17, 19, 48, 49, 54, and 129
C.I. Direct Violet: 9, 35, 47, 51, 66, 93, 95, and 99
C.I. Reactive Violet: 1, 2, 4, 5, 6, 8, 9, 22, 34, and 36
C.I. Disperse Violet: 1, 4, 8, 23, 26, 28, 31, 33, 35, 38, 48, and 56
C.I. Pigment Blue: 15:6
C.I. Pigment Violet: 19, 23, and 37
C.I. Direct Black: 17, 19, 22, 31, 32, 51, 62, 71, 74, 112, 113, 154, 168, and 195
C.I. Acid Black: 2, 48, 51, 52, 110, 115, and 156
C.I. Food Black: 1 and 2 Carbon black (Black Ink)

The yellow ink according to the present invention can be used in combination with another ink as well as the magenta ink and the cyan ink described above. In the present invention, in particular, the yellow ink is preferably used in combination with black ink. This is because the use of the black ink allows a black image having a high image density and an excellent hue to be formed.

The black ink preferably contains at least one coloring material selected from: a compound represented by the following general formula (7) or a salt thereof; a compound represented by the following general formula (8) or a salt thereof; and a condensed dye of a compound represented by the following general formula (9) and a compound represented by the following general formula (10). This is because those coloring materials are excellent in fastness properties, hue, and image density.

(In the general formula (8), $R_1$ and $R_2$ each independently represent a hydrogen atom; a hydroxyl group; an amino group; a carboxyl group; a sulfonic group; an alkyl group having 1 to 4 carbon atoms; or an alkoxy group having 1 to 4 carbon atoms, $R_3$ and $R_4$ each independently represent: a hydrogen atom; an alkyl group having 1 to 4 carbon atoms; an alkoxy group having 1 to 4 carbon atoms; a hydroxyl group; an alkyl group having 1 to 4 carbon atoms which may be substituted by a hydroxyl group or an alkoxy group having 1 to 4 carbon atoms; an alkoxy group having 1 to 4 carbon atoms which may be substituted by a hydroxyl group, an alkoxy group having 1 to 4 carbon atoms, a sulfonic group, or a carboxyl group; or an amino group substituted by an alkyl group or an acyl group, and n represents 0 or 1.)

General formula (7)

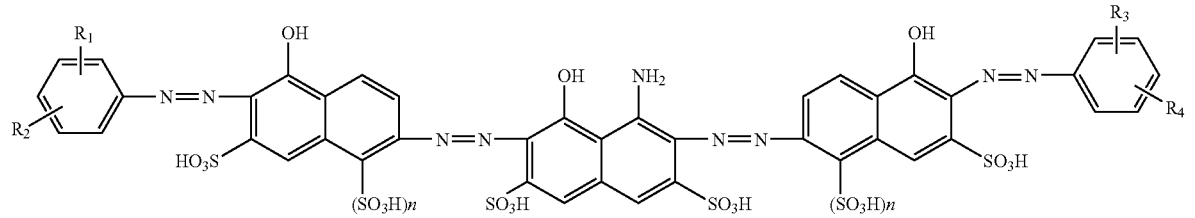

(In the general formula (7), $R_1$, $R_2$, $R_3$, and $R_4$ each independently represent a hydrogen atom; a hydroxyl group; an amino group; a carboxyl group; a sulfonic group; an alkyl group having 1 to 4 carbon atoms; an alkoxy group having 1 to 4 carbon atoms; an alkoxy group substituted by a hydroxyl group, an alkoxy group having 1 to 4 carbon atoms, a sulfonic group, or a carboxyl group; an alkoxy group having 1 to 4 carbon atoms which may be additionally substituted by a carboxyl group or a sulfonic group; or an amino group substituted by a phenyl group, an alkyl group, or an acyl group, and n represents 0 or 1.)

General formula (9)

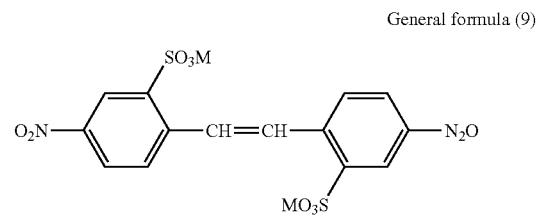

General formula (8)

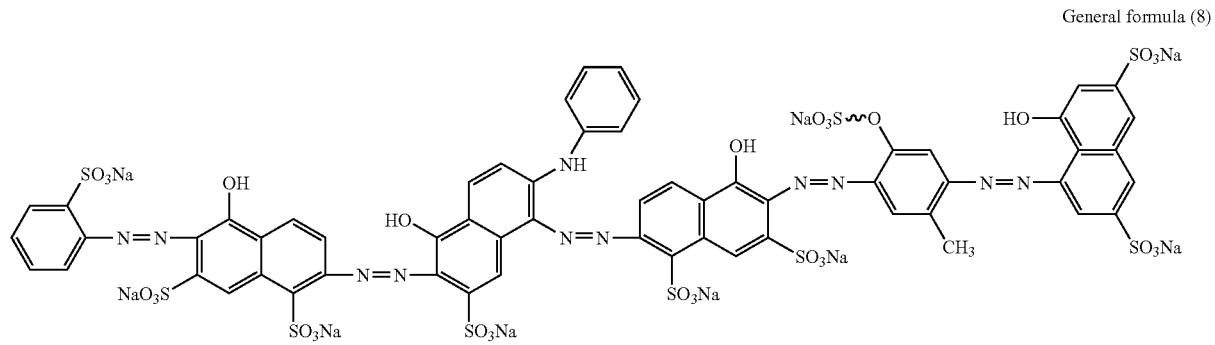

(In the general formula (9), M represents a hydrogen atom or an alkali metal atom.)

General formula (10)

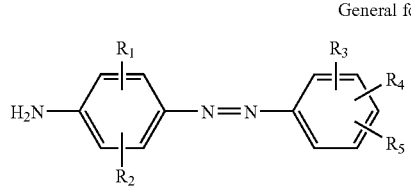

(In the general formula (10), $R_1$, $R_2$, $R_3$, $R_4$, and $R_5$ each independently represent a hydrogen atom; a halogen atom; a hydroxyl group; a sulfonic group; a carboxyl group; an alkyl group having 1 to 4 carbon atoms; or an alkoxy group having 1 to 4 carbon atoms.)

(Red Ink, Blue Ink, and Green Ink)

The yellow ink according to the present invention can be used in combination with another ink as well as the magenta ink and the cyan ink described above. In the present invention, the yellow ink is preferably used in combination with red ink, blue ink, or green ink. This is because the combined use of the yellow ink and the red, blue, or green ink allows a vivid image having a wide color gamut to be formed.

The red ink preferably contains at least C.I. Food Red 3 as a coloring material. This is because the coloring material is excellent in color developability, and the use thereof allows a vivid image having a wide color gamut to be formed.

The blue ink preferably contains at least C.I. Direct Blue 199 as a coloring material. This is because the coloring material is excellent in color developability, and the use thereof allows a vivid image having a wide color gamut to be formed.

The green ink preferably contains at least a compound represented by the following general formula (11) or a salt thereof and a compound represented by the following general formula (12) or a salt thereof as coloring materials. This is because those coloring materials are excellent in color developability, and the use thereof allows a vivid image having a wide color gamut to be formed.

General formula (11)

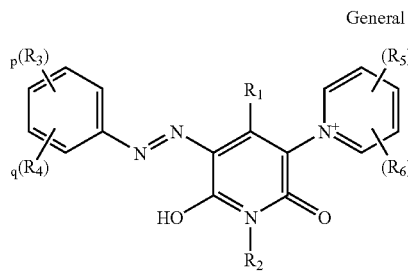

(In the general formula (11): $R_1$ and $R_2$ each independently represent a substituted or unsubstituted alkyl, aryl, or arylalkyl group, or a hydrogen atom; $R_3$ and $R_5$ each independently represent a carboxyl group or a salt thereof, a sulfonic group or a salt thereof, a phosphate group or a salt thereof, or an alkyl group substituted by any one of these groups; $R_4$ and $R_6$ each independently represent a group except those defined for $R_3$ and $R_5$; p and r each independently represent an integer of 1 to 5; q and s each independently represent an integer of 0 to 4; and $p+q \leq 5$ and $r+s \leq 5$.)

General formula (12)

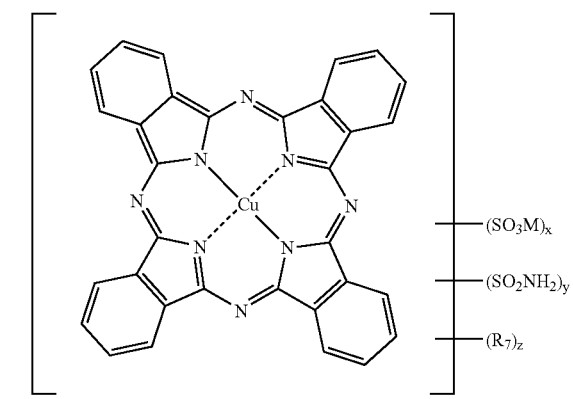

(In the general formula (12): M represents an alkali metal (such as Li, Na, K, Rb, Cs, or Fr) or ammonium; $R_7$ represents OH, COOM, or $R_8$COOM: (where $R_8$ represents an alkyl group having 4 to 9 carbon atoms and M represents an alkali metal or ammonium); and x, y, and z each independently represent 0, 1, 2, 3, or 4.)

(Aqueous Medium)

Water or an aqueous medium as a mixed solvent of water and various water-soluble organic solvents can be used for each ink constituting the ink set of the present invention.

The water-soluble organic solvents are not particularly limited as long as they are water-soluble, and examples thereof include an alcohol, polyhydric alcohol, polyglycol, glycol ether, a nitrogen-containing polar solvent, and a sulfur-containing polar solvent. Examples of a water-soluble organic solvent that can be used for the ink of the present invention are shown below, but the present invention is not limited to these water-soluble organic solvents. Specific examples of the water-soluble organic solvents include: alkyl alcohols each having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; alkylene glycols in each of which an alkylene group has 2 to 6 carbon atoms such as ethylene glycol, propylene glycol, butylene glycol, triethylene glycol, 1,2,6-hexane triol, thio diglycol, hexylene glycol, and diethylene glycol; lower alkyl ether acetates such as polyethylene glycol monomethyl ether acetate; lower alkyl ethers of polyhydric alcohols such as ethylene glycol monomethyl (or ethyl) ether, diethylene glycol methyl (or ethyl) ether, and triethylene glycol monomethyl (or ethyl) ether; polyhydric alcohols such as trimethylolpropane and trimethylolethane; glycerin; N-methyl-2-pyrrolidone; 2-pyrrolidone; and 1,3-dimethyl-2-imidazolidinone. Of course, the present invention is not limited thereto. Each of the water-soluble organic solvents may be used alone, or two or more of them may be used in combination.

The total content of those water-soluble organic solvents is preferably 5 mass % to 90 mass %, or more preferably 10 mass % to 50 mass % with respect to the total mass of the ink. A content of less than 5 mass % may cause the deterioration of reliability such as ejection property when the ink of the present invention is used as ink jet ink, while a content in excess of 90 mass % may cause insufficient supply of ink due to an increase in viscosity of the ink.

In addition, deionized water (ion-exchanged) is desirably used as water. The water content is preferably 10 mass % to 90 mass % with respect to the total mass of the ink.

(Other Additive)

In the present invention, various additives such as a surfactant, a pH adjustor, a rust inhibitor, an antiseptic, a mildewproofing agent, an antioxidant, an antireducing agent, an evaporation accelerator, a chelating agent, and a water-soluble polymer may be incorporated into each ink constituting the ink set as required.

(Ink Set)

The term "ink set" as used herein refers to a state where the yellow ink constituting the present invention is used in combination with the specific cyan and magenta inks constituting the present invention. For example, the term includes, of course, an ink tank itself having multiple ink tank portions integrated with each other. Furthermore, the term includes a state where multiple ink tanks different from each other are used together and a state where these ink tanks are integrated into a head portion.

(Recording Medium)

Any recording medium can be used for forming an image by means of the ink of the present invention as long as recording is performed by applying the ink to the recording medium.

The present invention is applicable to a recording medium in which a coloring material such as a dye or a pigment is adsorbed to a fine particle forming a porous structure in an ink-receiving layer and an image is formed from at least the fine particle having adsorbed thereto the coloring material, and the present invention is particularly suitable for the case where an ink-jet method is used. Such ink jet recording medium is preferably of a so-called absorption type in which ink is absorbed by a gap formed in an ink-receiving layer on a support.

An absorption type ink-receiving layer is constituted as a porous layer mainly composed of a fine particle and containing a binder and any other additive as required. Specific examples of the fine particle include: inorganic pigments such as silica, clay, talc, calcium carbonate, kaolin, aluminum oxide (for example, alumina or alumina hydrate), diatomaceous earth, titanium oxide, hydrotalcite, and zinc oxide; and organic pigments such as a urea formalin resin, an ethylene resin, and a styrene resin. One or more kinds of them are used. Examples of a binder that is suitably used include a water-soluble polymer and a latex. Examples of an available binder include: polyvinyl alcohol or a denatured product thereof; starch or a denatured product thereof; gelatin or a denatured product thereof; gun arabic; cellulose derivatives such as carboxymethylcellulose, hydroxyethylcellulose, and hydroxyproylmethylcellulose; vinyl-based copolymer latexes such as an SBR latex, an NBR latex, a methyl methacrylate-butadiene copolymer latex, a functional group-denatured polymer latex, and an ethylene-vinyl acetate copolymer; polyvinyl pyrrolidone; maleic anhydride or a copolymer thereof; and an acrylate copolymer. Two or more kinds of them can be used in combination as required. In addition, an additive may be used, and examples of an additive to be used as required include a dispersant, a thickener, a pH adjustor, a lubricant, a fluidity denaturing agent, a surfactant, a defoaming agent, a releasing agent, a fluorescent bleach, a UV absorber, and an antioxidant.

In particular, a recording medium having formed thereon an ink-receiving layer mainly composed of fine particles having an average particle size of 1 μm or less is preferably used in the present invention. Particularly preferable examples of the fine particles include silica fine particles and aluminum oxide fine particles. Preferable silica fine particles are silica fine particles typified by colloidal silica. Colloidal silica, which itself is available from the market, is particularly preferably that described in JP 2803134 B or JP 2881847 B. Preferable aluminum oxide fine particles are alumina hydrate fine particles and the like. An alumina hydrate represented by the following general formula can be exemplified as one example of such alumina hydrate fine particles.

$$AlO_{3-n}(OH)_{2n} \cdot mH_2O$$

(In the formula; n represents an integer of 1, 2, or 3, and m represents a value of 0 to 10, or preferably 0 to 5; provided, however, that m and n are not simultaneously 0. m may be or may not be an integer because $mH_2O$ also represents an aqueous phase that can desorb and is not involved in the formation of an $mH_2O$ crystal lattice in many cases. In addition, heating such kind of material may cause m to reach 0.)

An alumina hydrate can be produced by means of a conventionally known method such as: the hydrolysis of aluminum alkoxide or sodium aluminate described in U.S. Pat. No. 4,242,271 or U.S. Pat. No. 4,202,870; or a method involving adding an aqueous solution of sodium sulfate, aluminum chloride, or the like to an aqueous solution of sodium aluminate or the like to perform neutralization described in JP 57-44605 B.

The recording medium preferably has a support for supporting the above-described ink-receiving layer. Any support can be used without any particular limitation as long as its ink-receiving layer can be formed of the above-described porous fine particles and the support provides rigidity such that the support can be conveyed by a conveying mechanism of an ink jet printer or the like. Specific examples thereof include: a paper support formed of a pulp raw material mainly composed of natural cellulose fibers; a plastic support composed of a material such as polyester (for example, polyethylene terephthalate), cellulose triacetate, polycarbonate, polyvinyl chloride, polypropylene, or polyimide; resin-coated paper (for example, RC paper) having, on at least one side of base paper, a polyolefin resin coating layer added with a white pigment or the like.

(Ink Jet Recording Method)

The ink according to the present invention is particularly suitably used for an ink jet recording method including the step of ejecting the ink by an ink jet method. Examples of the ink jet recording method include a recording method involving applying mechanical energy to ink to eject the ink and a recording method involving applying thermal energy to ink to eject the ink. An ink jet recording method involving the use of thermal energy is particularly preferably used in the present invention.

(Ink Cartridge)

An example of an ink cartridge suitable for performing recording by means of the ink according to the present invention includes an ink cartridge including an ink storage portion for storing the ink.

In the present invention, an ink cartridge having a substantially equal difference in amount of evaporation between any two liquid chambers for inks constituting an ink set can be preferably used in the present invention. The phrase "a substantially equal difference in amount of evaporation between any two liquid chambers for inks constituting an ink set" refers to a state where a difference in evaporation rate between any two liquid chambers becomes about 1% or less, for example, when the evaporation rate of water incorporated into each of the liquid chambers is measured.

Figure 8:
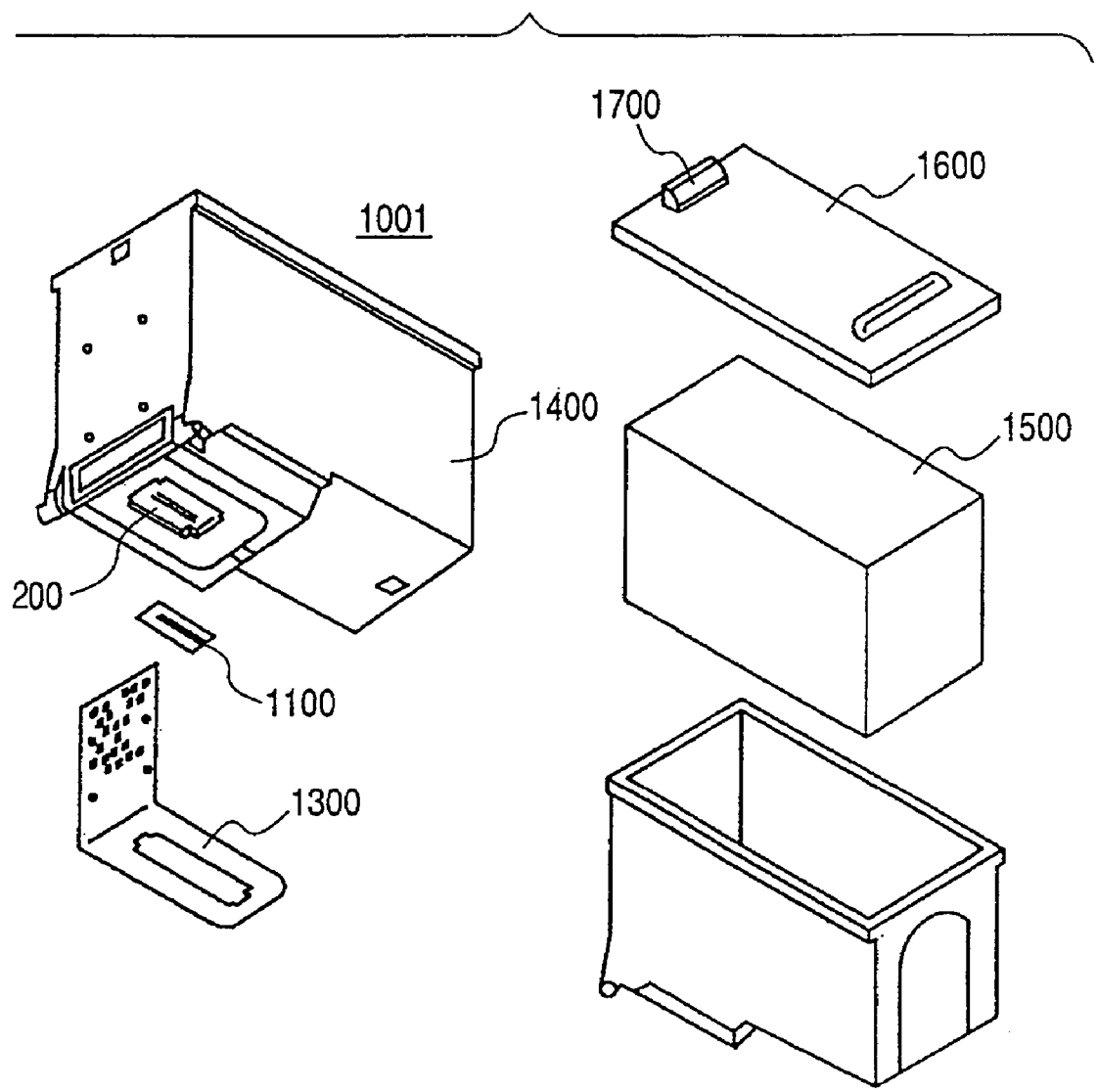
FIG. 8 is an exploded view of a recording head.

FIG. 8 is an exploded view of a recording head that can be used for the present invention. The recording head shown in FIG. 8 is integrated with an ink tank. A recording head 1001 is supported by and fixed to carriage positioning means mounted on an ink jet recording apparatus main body and an electrical contact, and is detachable to a carriage. The recording head is replaced when mounted ink is consumed.

The recording head 1001, which is intended for the ejection of ink, is constituted by: a recording element substrate 1100 on which ink supply orifices are formed in parallel; an electric wiring tape 1300 for forming an electrical signal path through which an electrical signal for ejecting ink is applied; an ink supply/hold member 1400 formed by molding a resin; an ink absorbent 1500 for generating a negative pressure for holding the ink; and a cap member 1600.

The ink supply/hold member 1400 has a space for holding the absorbent 1500 for generating a negative pressure for holding cyan, magenta, and yellow inks in the absorbent to provide a function as an ink tank, and forms an independent ink flow path for introducing ink to the ink supply orifices of the recording element substrate 1100 to provide an ink supply function. An ink supply orifice 1200 for supplying ink to the recording element substrate 1100 is formed at a downstream portion of the ink flow path, and the recording element substrate 1100 is fixed to the ink supply/hold member 1400 in such a manner that the ink supply orifices of the recording element substrate 1100 are in communication with the ink supply orifice 1200 of the ink supply/hold member 1400. In addition, the rear surface of part of the electric wiring tape 1300 is fixed to the plane around the vicinity of the ink supply orifice 1200. The cap member 1600 is welded of an upper opening portion of the ink supply/hold member 1400 to close the space inside the ink supply/hold member 1400. The cap member 1600 has an engagement portion 1700 for fixing the recording head to an ink jet recording apparatus.

Figure 9:
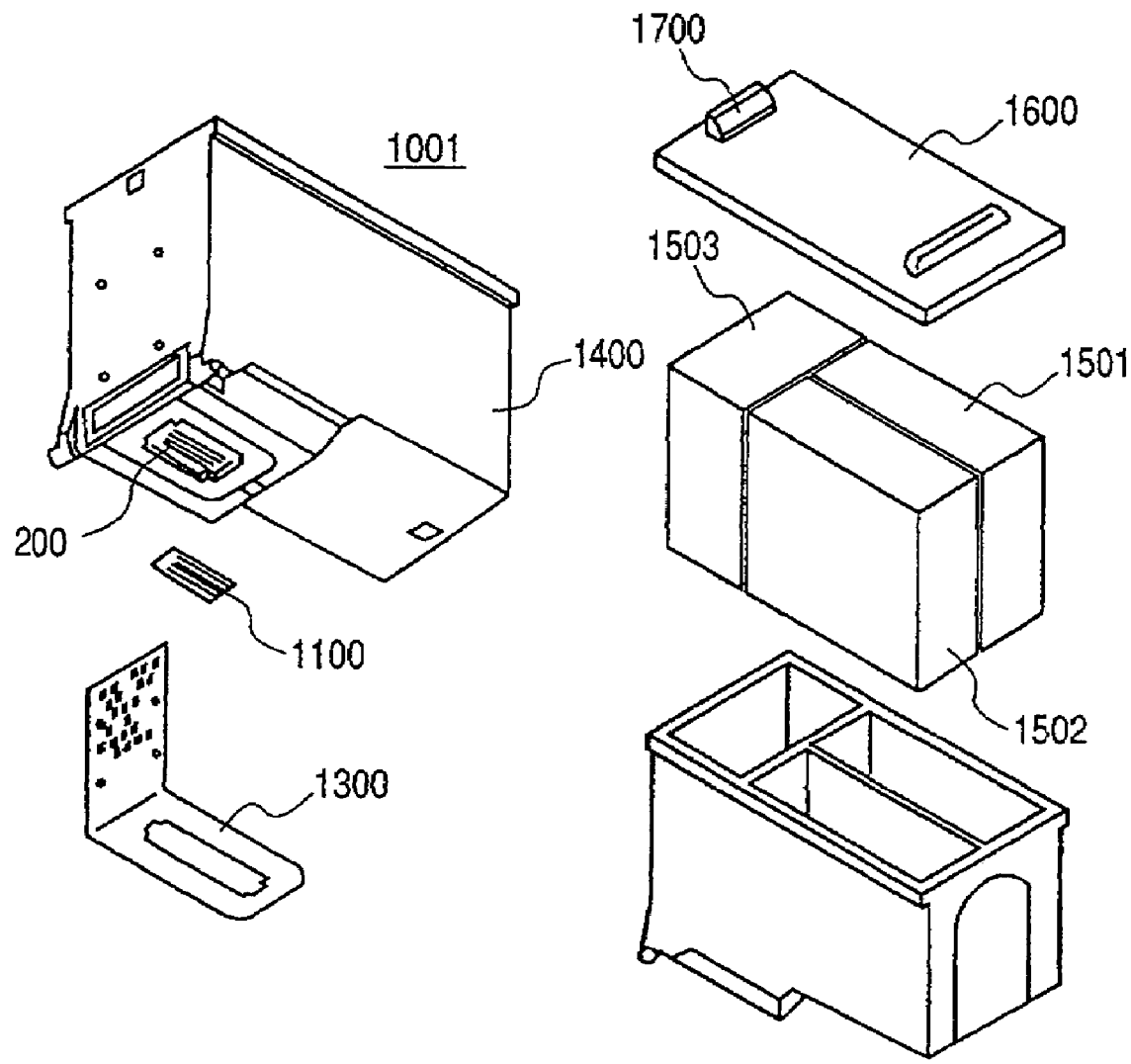
FIG. 9 is an exploded view of a recording head.

FIG. 9 is an exploded view of another recording head that can be used for the present invention. The recording head shown in FIG. 9 is integrated with an ink tank as in the case of FIG. 8. Multiple inks different from each other in color (such as cyan, magenta, and yellow inks) can be mounted on a recording head 1001, and the recording head is replaced when mounted ink is consumed.

The recording head 1001, which is intended for the ejection of multiple inks different from each other in color (such as cyan, magenta, and yellow inks), includes a recording element substrate 1100 on which ink supply orifices for cyan, magenta, and yellow are formed in parallel. An ink supply/hold member 1400 has a space for independently holding absorbents 1501, 1502, and 1503 for generating negative pressures for holding cyan, magenta, and yellow inks in the absorbents to provide a function as an ink tank, and forms an independent ink flow path for introducing each ink to the ink supply orifices of the recording element substrate 1100 to provide an ink supply function.

(Recording Unit)

An example of a recording unit suitable for performing recording by means of the ink according to the present invention includes a recording unit including an ink storage portion for storing the ink and a recording head. In particular, a recording unit in which the recording head applies thermal energy corresponding to a recording signal to the ink to generate an ink droplet by virtue of the energy can be exemplified.

(Ink Jet Recording Apparatus)

An example of a recording apparatus suitable for performing recording by means of the ink according to the present invention includes a recording apparatus in which thermal energy corresponding to a recording signal is applied to ink in the chamber of a recording head having an ink storage portion for storing the ink to generate an ink droplet by virtue of the energy.

Hereinafter, the schematic constitution of a mechanism portion of an ink jet recording apparatus will be described. A recording apparatus main body is constituted by a sheet feeding portion, a sheet conveying portion, a carriage portion, a sheet discharge portion, and a cleaning portion, and an external packaging portion for protecting them and providing them with design to achieve a role of each mechanism. Hereinafter, the outline of each of them will be described.

Figure 2:
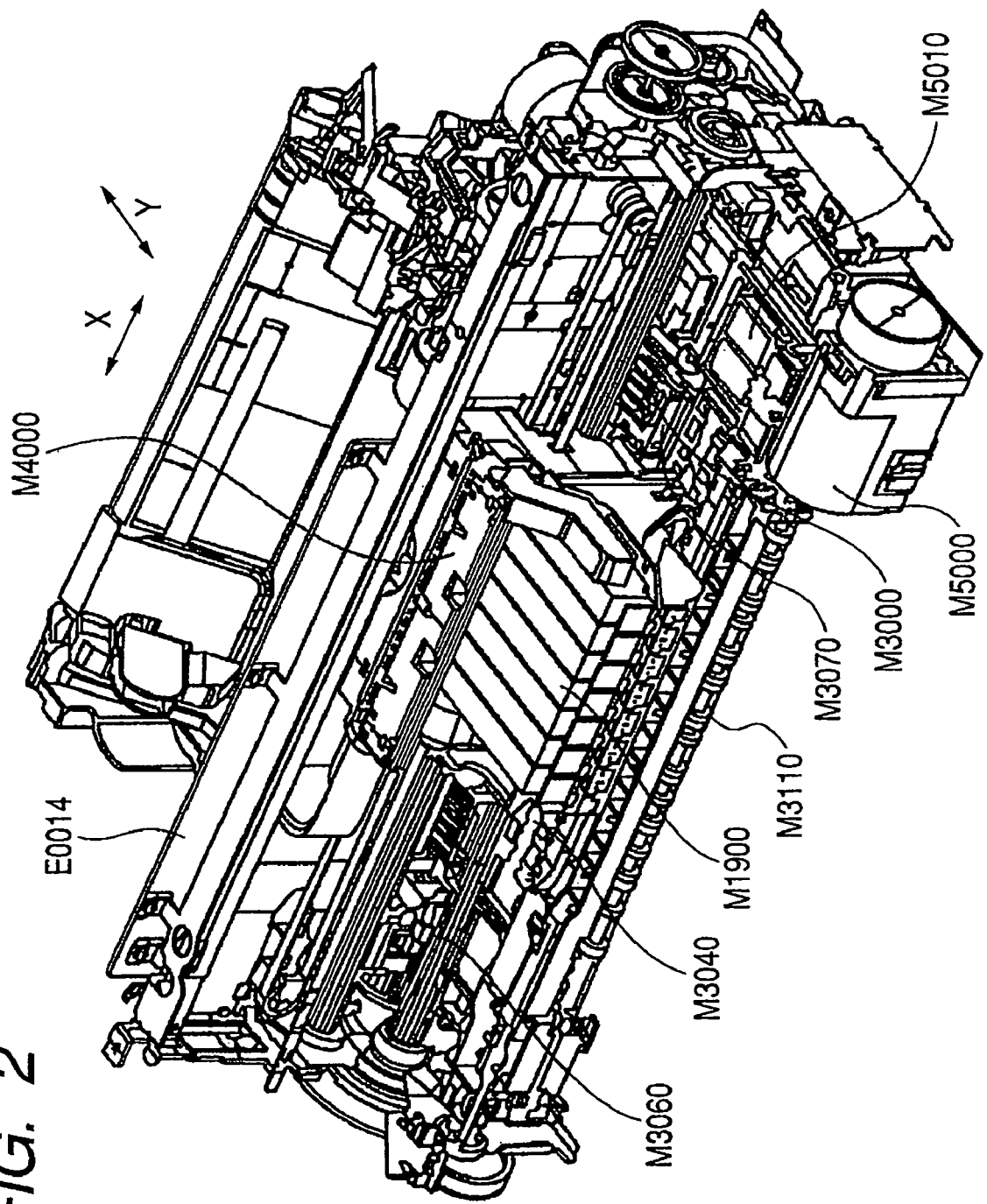
FIG. 2 is a perspective view of a recording apparatus.
Figure 3:
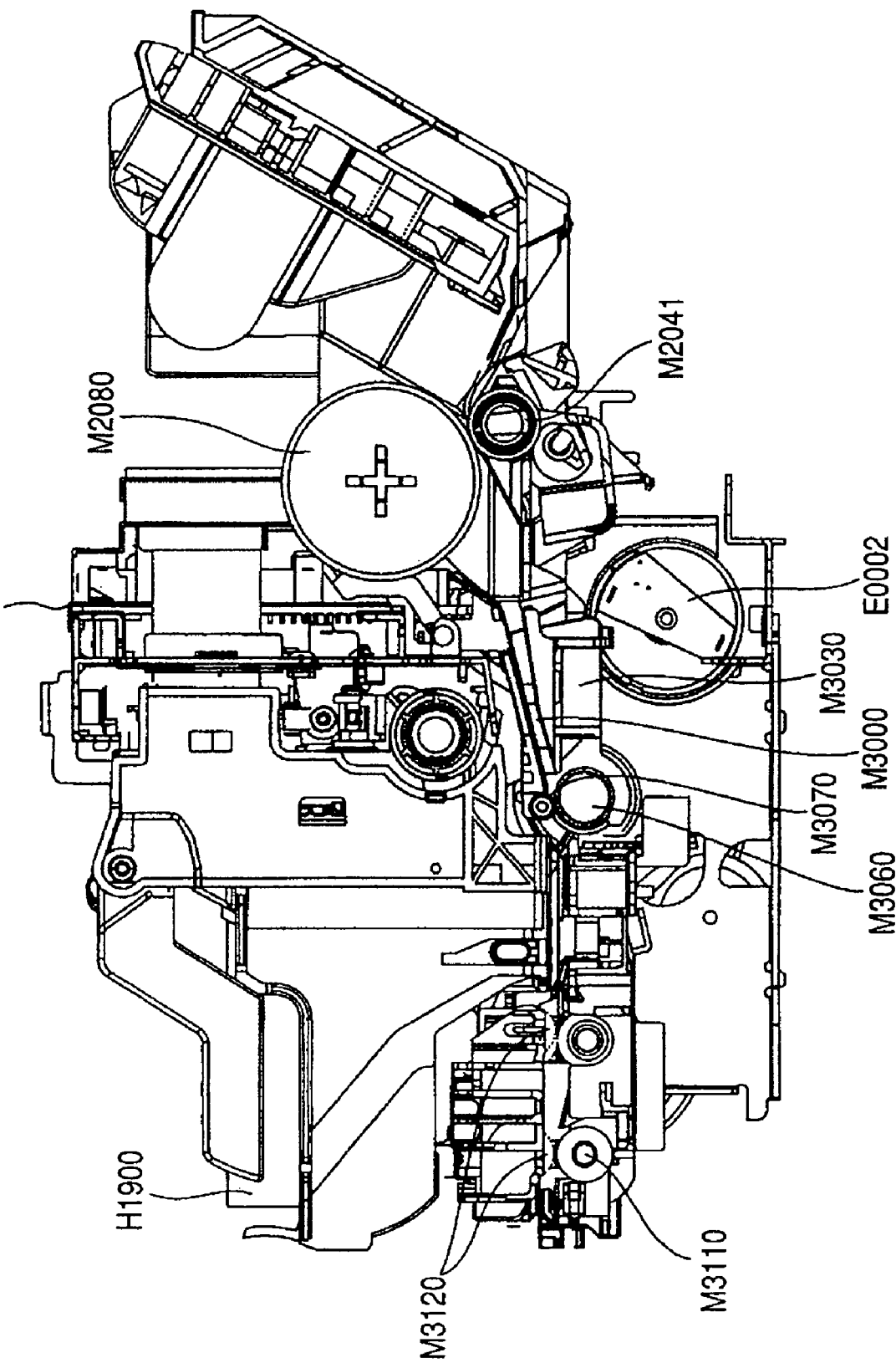
FIG. 3 is a perspective view of a mechanism portion of the recording apparatus.

FIG. 2 is a perspective view of a recording apparatus. FIGS. 2 and 3 are views for explaining the internal mechanism of a recording apparatus main body. FIG. 2 is a perspective view seen from an upper right portion, and FIG. 3 is a side sectional view of the recording apparatus main body.

When a sheet is to be fed in the recording apparatus, only a predetermined number of recording media are sent to a nip portion composed of a sheet feeding roller M2080 and a separating roller M2041 in the sheet feeding portion including a sheet feeding tray M2060. The sent recording media are separated at the nip portion, and only the uppermost recording medium is conveyed. The recording medium sent to the sheet conveying portion is guided by a pinch roller holder M3000 and a paper guide flapper M3030 to be sent to a roller pair composed of a conveying roller M3060 and a pinch roller M3070. The roller pair composed of the conveying roller M3060 and the pinch roller M3070 are rotated by the driving of an LF motor E0002, and the rotation causes the recording medium to be conveyed on a platen M3040.

In the carriage portion, when an image is to be formed on a recording medium, a recording head H1001 (FIG. 4) is arranged at a target image forming position, and ink is ejected to the recording medium in accordance with a signal from an electrical substrate E0014. Details about the constitution of the recording head H1001 will be described later. While recording is performed by the recording head H1001, recording main scanning in which a carriage M4000 scans in a column direction and sub scanning in which a recording medium is conveyed in a row direction by the conveying roller M3060 are alternately repeated, whereby an image is formed on the recording medium.

Finally, the recording medium on which an image has been formed is sandwiched at a nip between a first sheet discharge roller M3110 and a spur M3120 in the sheet discharge portion, conveyed, and discharged to a sheet discharge tray M3160.

In the cleaning portion when a pump M5000 is allowed to act in a state where a cap M5010 is brought into close contact with an ink ejection orifice of the recording head H1001 for the purpose of cleaning the recording head H1001 before and after image recording, unnecessary ink and the like are sucked from the recording head H1001. The ink remaining in the cap M5010 is sucked with the cap M5010 opened, whereby neither adhesion of the remaining ink nor a subsequent harmful effect occurs.

(Constitution of Recording Head)

The constitution of a head cartridge H1000 will be described. The head cartridge H1000 includes the recording head H1001, means for mounting ink tanks H1900, and means for supplying ink from the ink tanks H1900 to the recording head, and is detachably mounted on the carriage M4000.

Figure 4:
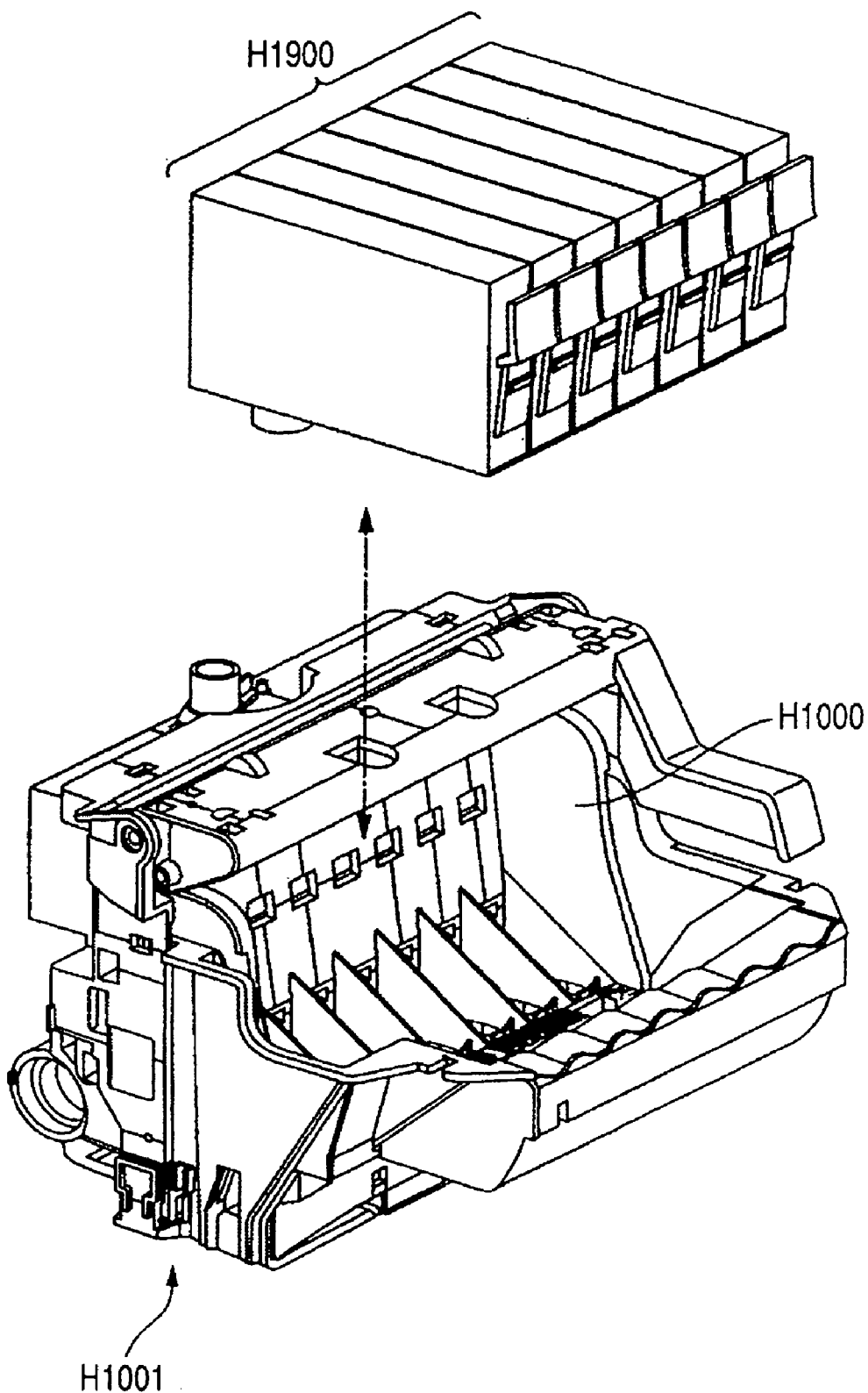
FIG. 4 is a sectional view of the recording apparatus.

FIG. 4 shows how the ink tanks H1900 are mounted on the head cartridge H1000. The recording apparatus forms an image by means of yellow, magenta, cyan, black, pale magenta, pale cyan, and green inks, so the ink tanks H1900 are independently prepared for seven colors. The ink according to the present invention is used for at least one of the above inks. In addition, as shown in the figure, each ink tank is detachable to the head cartridge H1000. The ink tanks H1900 can be detached in a state where the head cartridge H1000 is mounted on the carriage M4000.

Figure 5:
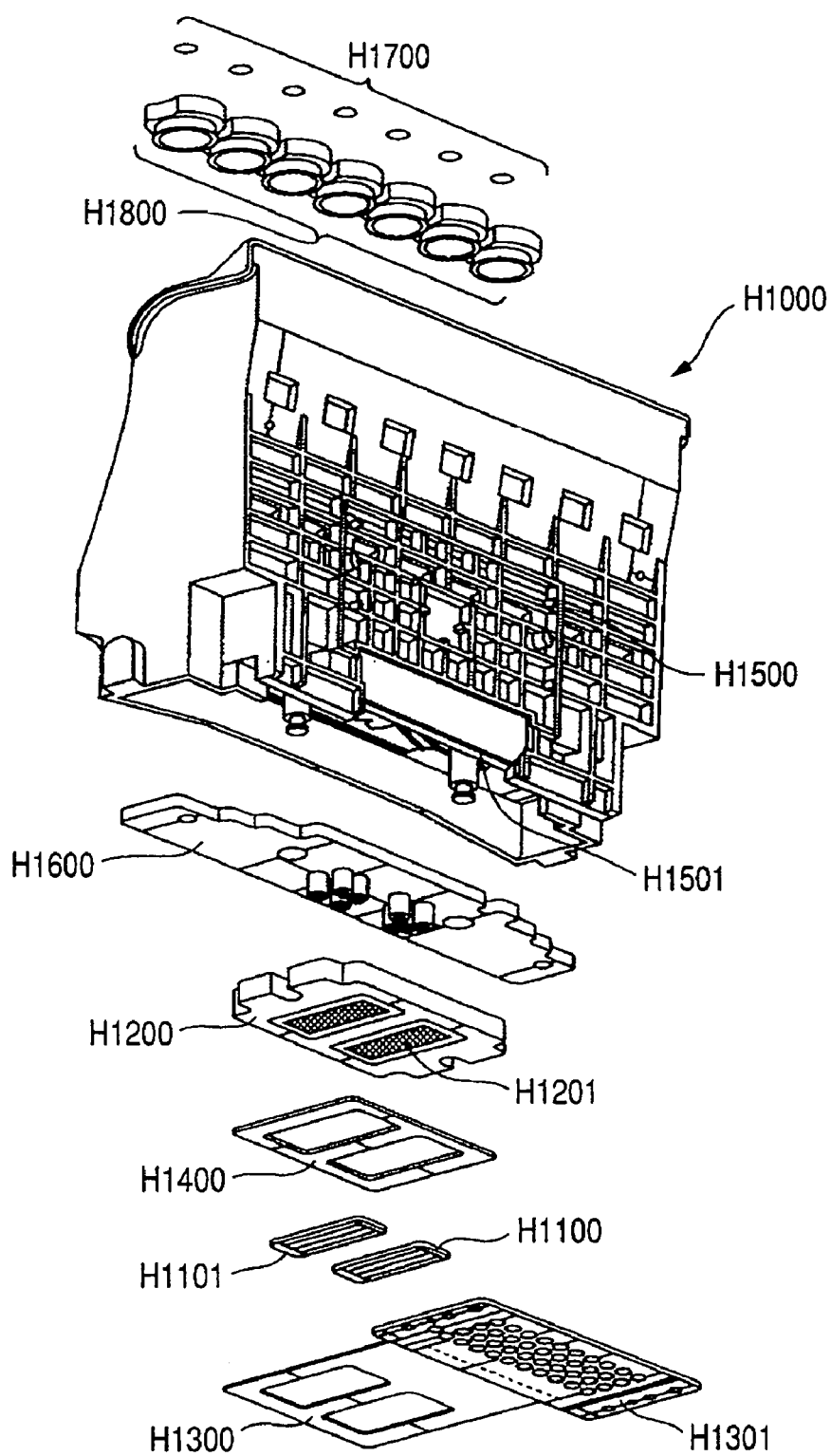
FIG. 5 is a perspective view showing a state where an ink tank is mounted on a head cartridge.

FIG. 5 shows an exploded perspective view of the head cartridge H1000. In the figure, the head cartridge H1000 includes a first recording element substrate H1000, a second recording element substrate H1101, a first plate H1200, a second plate H1400, an electric wiring substrate H1300, a tank holder H1500, a flow path forming member H1609, a filter H1700, and a seal rubber H1800.

Each of the first recording element substrate H1100 and the second recording element substrate H1101 is an Si substrate having multiple recording elements (nozzles) for ejecting ink formed on one surface by means of photolithography. Electric wiring made of Al or the like for supplying power to each recording element is formed by means of a film formation technique, and multiple ink flow paths corresponding to the individual recording elements are also formed by means of photolithography. Furthermore, ink supply orifices for supplying ink to the multiple ink flow paths are formed so as to open on the rear surface.

Figure 6:
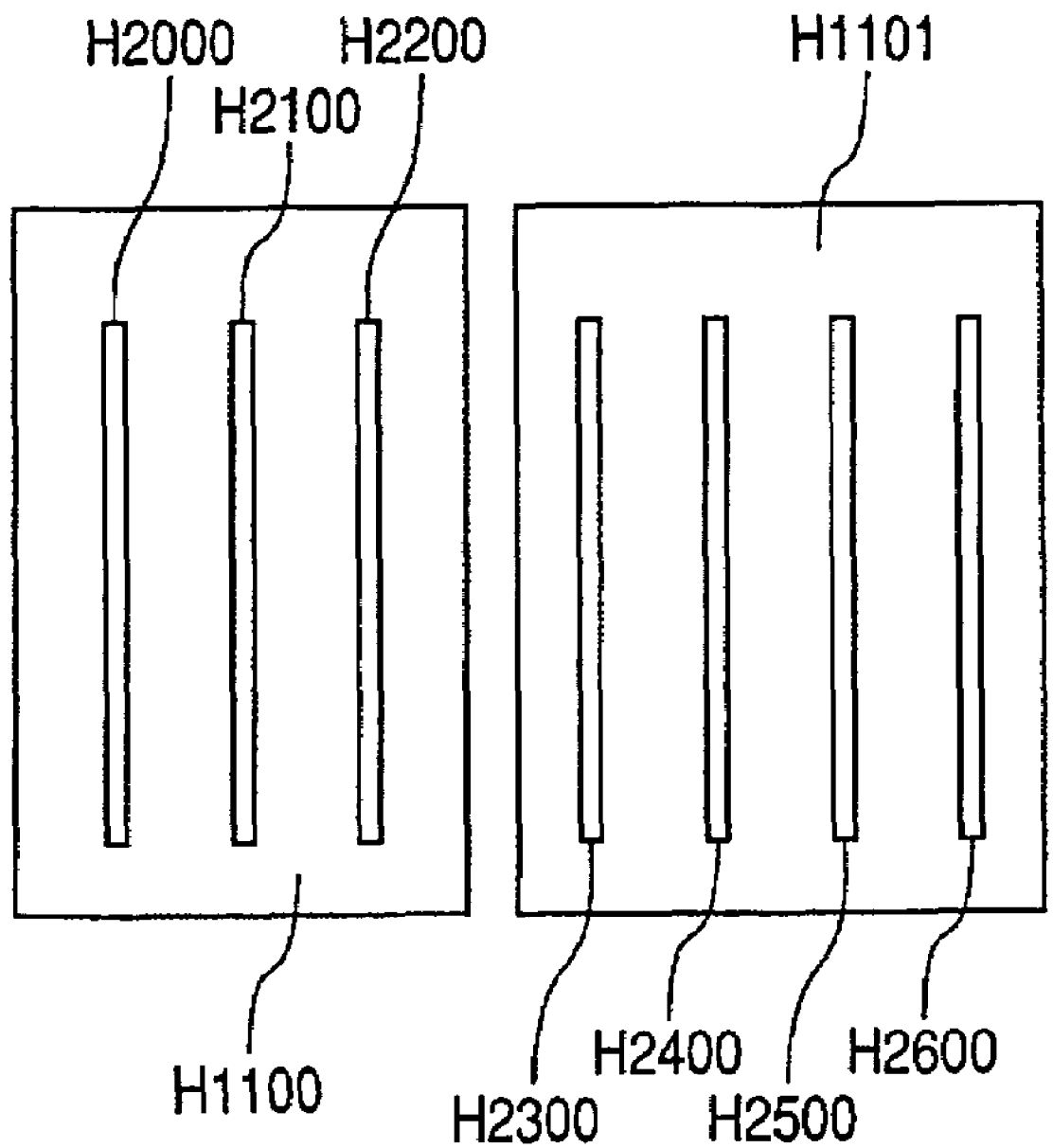
FIG. 6 is an exploded perspective view of the head cartridge.
Figure 7:
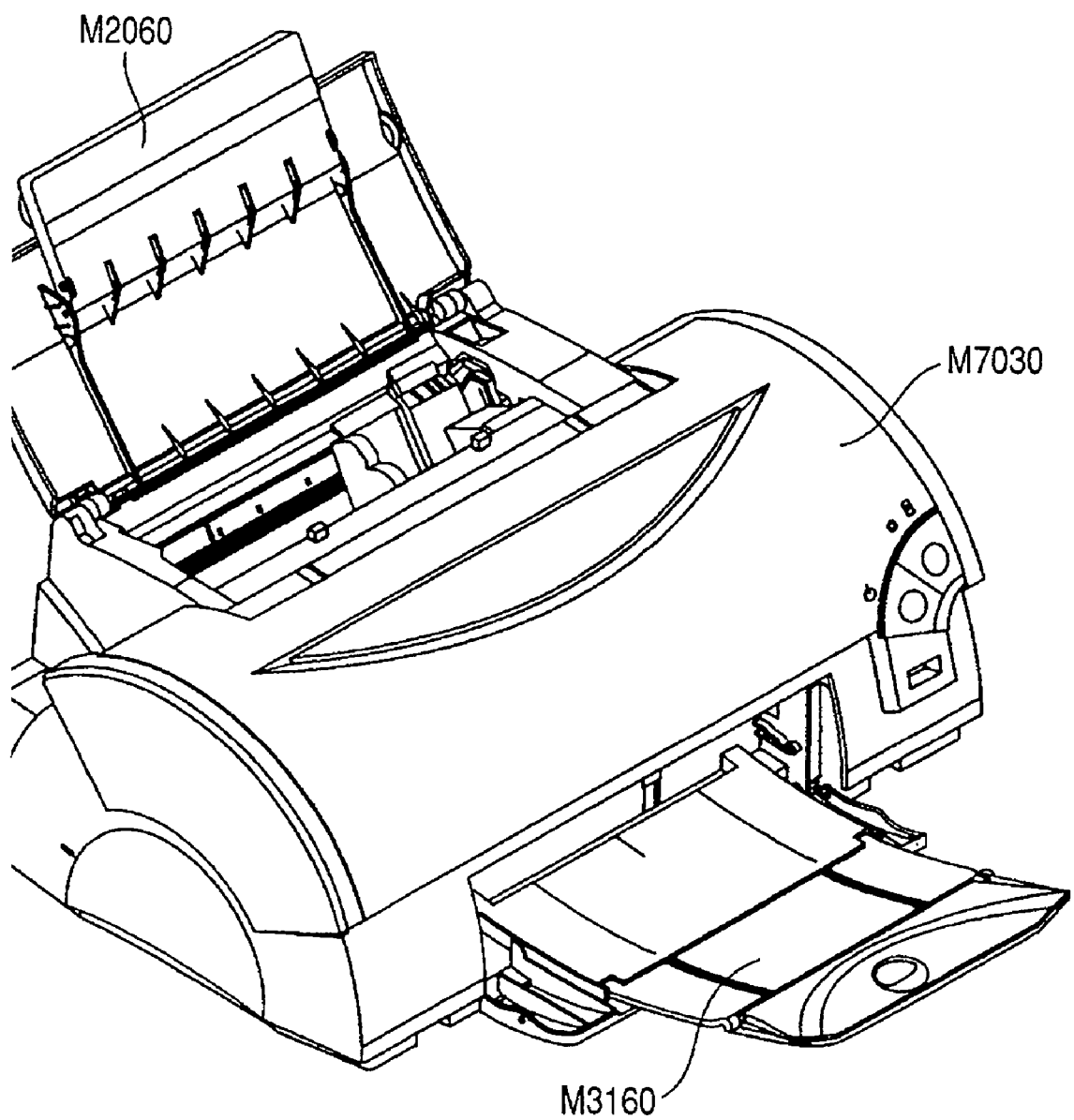
FIG. 7 is a front view showing a recording element substrate in the head cartridge.

FIG. 6 is an enlarged front view for explaining the constitution of each of the first recording element substrate H1100 and the second recording element substrate H1101. Reference symbols H2000 to H2600 denote recording element trains (which may hereinafter be also referred to as nozzle trains) corresponding to different ink colors. The first recording element substrate H1100 has nozzle trains for three colors: the nozzle train H2000 to which yellow ink is supplied, the nozzle train H2100 to which magenta ink is supplied, and the nozzle train H2200 to which cyan ink is supplied. The second recording element substrate H1101 has nozzle trains for four colors: the nozzle train H2300 to which pale cyan ink is supplied, the nozzle train H2400 to which black ink is supplied, the nozzle train H2500 to which orange ink is supplied, and the nozzle train H2600 to which pale magenta ink is supplied.

Each nozzle train is constituted by 768 nozzles arranged at an interval of 1,200 dpi (dot/inch; reference value) in the direction in which a recording medium is conveyed (hereinafter, referred to as the conveying direction), and each nozzle ejects about 2 pl of ink. An opening area in each nozzle ejection orifice is set to about 100 µm². The first recording element substrate H1100 and the second recording element substrate H1101 are bonded and fixed to the first plate H1200 having formed thereon ink supply orifices H1201 for supplying ink to the first recording element substrate H1100 and the second recording element substrate H1101.

The second plate H1400 having openings is also bonded and fixed to the first plate H1200. The second plate H1400 holds the electric wiring substrate H1300 in such a manner that the electric wiring substrate H1300, and the first recording element substrate H1100 and the second recording element substrate H1101 are electrically connected.

The electric wiring substrate H1300 applies an electrical signal for causing each of the nozzles formed on the first recording element substrate H1100 and the second recording element substrate H1101 to eject ink. The electric wiring substrate H1300 has: electric wiring corresponding to each of the first recording element substrate H1100 and the second recording element substrate H1101; and an external signal input terminal H1301 which is positioned at an end portion of the electric wiring to receive an electrical signal from the recording apparatus main body. The external signal input terminal H1301 is positioned and fixed to the back surface side of the tank holder H1500.

Meanwhile, the flow path forming member H1600 is fixed by means of, for example, ultrasonic welding to the tank holder H1500 for holding the ink tanks H1900. Thus, an ink flowpath H1501 passing from the ink tanks H1900 to the first plate H1200 is formed.

The filter H1700 is arranged at an end portion on the ink tank side of the ink flow path H1501 engaged with the ink tanks H1900, so the filter H1700 prevents dust from entering from the outside. The seal rubber H1800 is mounted on the portion at which the ink flow path H1501 is engaged with the ink tanks H1900 to prevent ink from evaporating from the portion.

Furthermore, as described above, the head cartridge H1000 is constituted by connecting through bonding or the like a tank holder portion constituted by the tank holder H1500, the flow path forming member H1600, the filter H1700, and the seal rubber H1800, and the recording head portion H1001 constituted by the first recording element substrate H1100, the second recording element substrate H1101, the first plate H1200, the electric wiring substrate H1300, and the second plate H1400.

Description has been made here by taking, as an example of an embodiment of a recording head, a recording head according to a bubble jet (registered trademark) system that performs recording by means of an electrothermal transducer (recording element) for generating thermal energy for causing ink to generate film boiling in accordance with an electrical signal.

The representative structure and principle of a bubble jet system are preferably basic principles disclosed in, for example, descriptions of U.S. Pat. No. 4,723,129. and U.S. Pat. No. 4,740,796. The method is applicable to any one of so-called an on-demand type and a continuous type. In particular, the method is effective for the on-demand type because of the following reason. At least one driving signal which corresponds to recording information and causes a sudden increase in temperature exceeding nuclear boiling is applied to an electrothermal transducer arranged in correspondence with a sheet or liquid flow path holding a liquid (ink), to thereby cause the electrothermal transducer to generate thermal energy. Then, a thermal action surface of a recording head is caused to generate film boiling. As a result, an air bubble in the liquid (ink) can be formed so as to be in one-to-one correspondence with the driving signal. The growth and contraction-of the air bubble cause the liquid (ink) to be ejected through an opening for ejection, thereby forming at least one droplet. The driving signal is more preferably of a pulse shape because the growth and contraction of an air bubble can be performed immediately and appropriately, and hence the liquid (ink) can be ejected with excellent responsiveness.

An example of a second embodiment of an ink jet recording apparatus utilizing mechanical energy includes anon-demand ink jet recording head including: a nozzle forming substrate having multiple nozzles; pressure generating means arranged so as to be opposed to the nozzles and composed of a piezoelectric material and a conductive material; and ink filling the surroundings of the pressure generating means, in which the pressure generating means is displaced by an applied voltage to eject a small ink droplet from a nozzle.

The ink jet recording apparatus is not limited to such apparatus as described above in which a head and an ink tank are separated, and may be one in which a head and an ink tank are integrated so that they are unseparable. The ink tank may be separably or unseparably integrated with the head to be mounted on a carriage, or may be mounted at a fixing portion of an apparatus to supply ink to a recording head through an ink supply member such as a tube. When the ink tank is provided with a constitution for applying a preferable negative pressure to the recording head, an absorber may be arranged in an ink storage portion of the ink tank, or the ink tank may have a flexible ink storage bag and a spring portion for applying bias to expand the internal volume of the bag. The recording apparatus may adopt a serial recording system as described above, or may be in the form of a line printer obtained by aligning recording elements over the range corresponding to the entire width of a recording medium.

(Color Fading Balance)

The term "color fading balance" as used herein refers to the deterioration of an image density and a hue with time in an image of the yellow ink according to the present invention, an image of the cyan and magenta inks to be used in combination with the yellow ink, and an image with a secondary or tertiary color formed by means of the inks.

FIG. 1 shows an image of the deterioration of an image density with time in the present invention. In FIG. 1, the axis of abscissa indicates the period during which an image formed by means of each ink is stored, and the axis of ordinate indicates the image density of the image formed by means of each ink. In general, an image formed by means of any ink tends to have a lower image density as the image is stored for a longer period. At this time, if a change with time in the image density of an image formed by means of each ink constituting an ink set significantly differs from ink to ink, a color fading balance can be said to be poor.

Here, as shown in FIG. 1, the present invention is characterized in that a reduction in image density due to a change with time in each of an image of the yellow ink according to the present invention (Δ in FIG. 1), an image of the cyan and magenta inks to be used in combination with the yellow inks (◊ in FIG. 1), and an image with a secondary or tertiary color formed by means of the inks (□ in FIG. 1) is in a constant range at all times (the range indicated by broken lines in FIG. 1). In other words, with the constitution of the present invention, an image with a uniformized color fading balance at any time point in the period during which the image is stored can be obtained.

EXAMPLES

Hereinafter, the present invention will be described in more detail by way of examples and comparative examples. However, the present invention is not limited to the following examples unless the examples depart from the gist of the present invention. Unless otherwise stated, the term "part(s)" of each ink component in examples and comparative examples represents "part(s) by mass".

(Synthesis of Coloring Material)

(Coloring Material for Yellow Ink)

Diazotized 4-nitro-4'-aminostilbene-2,2-disulfonic acid and 3-aminonaphthalene-1-sulfonic acid were subjected to coupling. The resultant was turned into a triazole, and a nitro group of the triazole was reduced to an amino group by means of a conventionally known method to produce aminostilbene-triazole. Aminostilbene-triazole was dissolved into water, and sodium nitrite and hydrochloric acid were added dropwise to the solution to perform diazotization. The resultant was added dropwise to an aqueous solution of a compound represented by the following formula (α), and the whole was subjected to coupling, followed by dialysis with sodium chloride. The compound was diazotized with an aqueous solution of sodium nitrite, and was turned into a triazole by adding an aqueous solution of 6-aminonaphthalene-2-sulfonic acid. The triazole was dialyzed with sodium chloride to prepare a coloring material represented by the following formula (Y-a).

Formula (α)

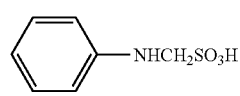

Formula (Y-a)

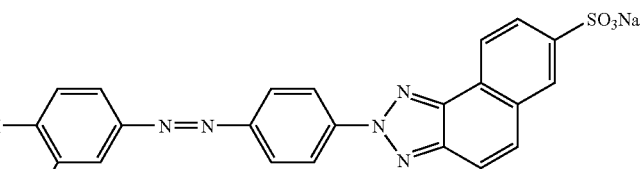

(Coloring Material for Magenta Ink)

A compound represented by the following formula (β), sodium carbonate, and ethyl benzoyl acetate were allowed to react to one another in xylene, and the reactant was filtered and washed. To the resultant, were sequentially added with m-amino acetonitride, copper acetate, and sodium carbonate in N,N-dimethylformamide to carry out a reaction, and the reactant was filtered and washed. The resultant was sulfonated in fuming sulfuric acid, and the resultant was filtered and washed. The resultant was subjected to a condensation reaction with cyanuric chloride in the presence of sodium hydroxide. Anthranilic acid was added to the reaction liquid to carry out a condensation reaction in the presence of sodium hydroxide. The resultant was filtered and washed to prepare a coloring material represented by the following formula (M-a).

tion. After that, the reaction solution was cooled, and the precipitated crystals were filtered to prepare a wet cake of copper phthalocyanine tetrasulfonic chloride.

Lipal OH, cyanuric-chloride, and monosodium aniline-2,5-disulfonate were added to ice water, and were allowed to react while an aqueous solution of sodium hydroxide was added. Next, an aqueous solution of sodium hydroxide was added to the reaction solution to adjust the pH of the reaction solution to 10. 28% ammonia water and ethylenediamine were added to the reaction solution to perform reaction. Sodium chloride and concentrated hydrochloric acid were added to the resultant reaction solution to precipitate crystals. The precipitated crystals were filtered and fractionated, and was washed with a 20% aqueous solution of sodium chloride to prepare a wet cake. Methanol and water were Formula (β)

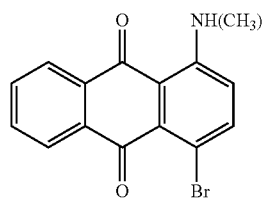

Formula (M-a)

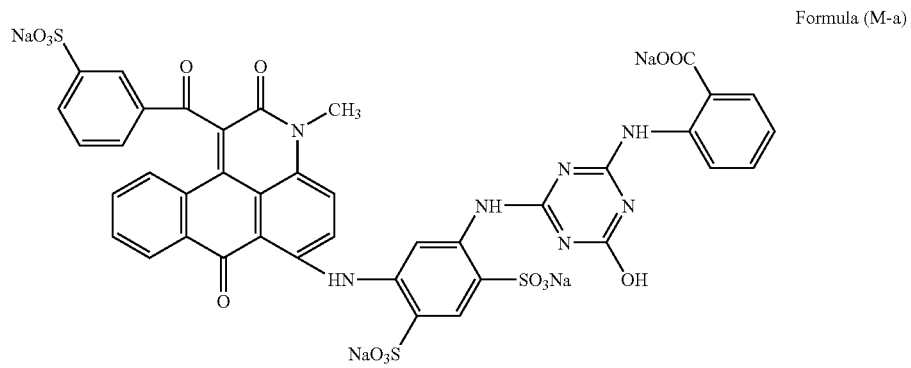

(Coloring Material for Cyan Ink)

Sulfolane, monosodium 4-sulfophthalate, ammonium chloride, urea, ammonium molybdate, and copper (II) chloride were mixed, stirred, and washed with methanol. After that water was added to the resultant, and an aqueous solution of sodium hydroxide was used to adjust the pH of the solution to 11. An aqueous solution of hydrochloric acid was added to the resultant solution under stirring, and then sodium chloride was gradually added to precipitate crystals. The resultant crystals were filtered out and washed with a 20% aqueous solution of sodium chloride, and then methanol was added. The precipitated crystals were filtered out, washed with a 70% aqueous solution of methanol, and dried to prepare tetrasodium copper phthalocyanine. tetrasulfonate as blue crystals.

Tetrasodium copper phthalocyanine tetrasulfonate thus prepared was gradually added to chlorosulfonic acid, and then thionyl chloride was added dropwise to perform reacadded to the resultant wet cake, and the whole was filtered, washed with methanol, and dried to prepare a compound represented by a formula (γ).

The wet cake of copper phthalocyanine tetrasulfonic chloride synthesized in the above was added to an ice water, and the whole was stirred to prepare a suspension. Ammonia water and the compound represented by formula (γ) synthesized in the above were added to the suspension to perform reaction. Water and sodium chloride were added to the mixture to precipitate crystals. The resultant crystals were filtered, washed with an aqueous solution of sodium chloride, and filtered again, washed, and dried to prepare a coloring material represented by a formula (C-a) as a blue crystal. The foregoing reaction allows one to assume that the coloring material has an average number of substituents in the formula (C-a) of l=0, m=1.0 to 2.0, or n=2.0 to 3.0.

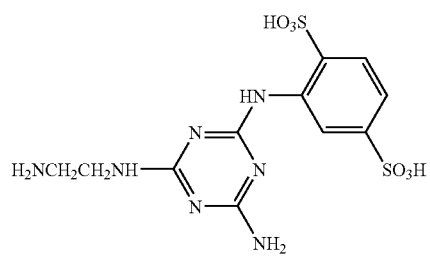

Formula (γ)

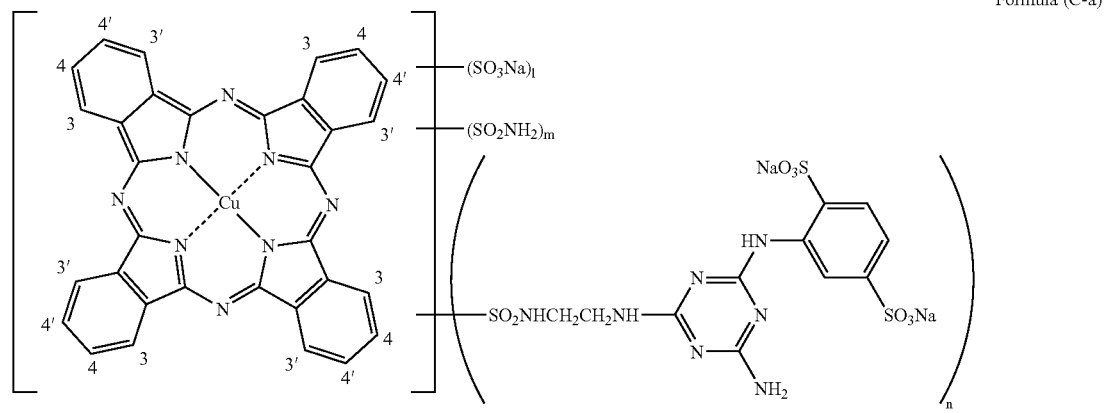

Formula (C-a)

(Preparation of Ink)

(Preparation of Yellow Ink)

The respective components shown in Table 2 below were mixed and sufficiently stirred. After that, the resultant was filtered through a membrane filter having a pore size of 0.2 μm under pressure to prepare each of yellow inks Y1 to Y5.

TABLE 2

|  |  |  | Yellow Ink | | | | |
|---|---|---|---|---|---|---|---|
|  |  |  | Y1 | Y2 | Y3 | Y4 | Y5 |
| Coloring material | A group | C.I. Direct Yellow 132 | 2.5 | 2.0 |  |  |  |
|  |  | C.I. Direct Yellow 173 |  |  |  | 1.0 | 5.0 |
|  | B group | Formula (Y-a) | 0.5 |  |  |  |  |
|  |  | C.I. Direct Yellow 86 |  | 1.0 |  |  |  |
|  |  | C.I. Direct Yellow 142 |  |  | 3.0 |  | 4.0 |
| Water-soluble organic solvent | Glycerin | | 10.0 |  | 10.0 | 10.0 |  |
|  | Ethylene glycol | |  | 3.0 |  |  | 2.0 |
|  | Polyethylene glycol 200 | |  | 10.0 |  |  | 10.0 |
|  | Diethylene glycol | | 5.0 | 4.0 | 4.0 | 4.0 | 5.0 |
|  | Triethylene glycol | |  |  | 2.0 |  |  |
|  | N-methyl-2-pyrrolidone | | 3.0 |  | 3.0 | 3.0 | 4.0 |
|  | Urea | | 8.0 | 8.0 | 8.0 | 8.0 | 8.0 |
| Acetylenol EH (*) |  |  | 0.6 | 0.6 | 0.6 | 0.6 | 0.6 |
| Isopropanol |  |  | 3.0 | 3.0 | 3.0 | 3.0 | 3.0 |
| Ion-exchanged water |  |  | 67.4 | 68.4 | 65.4 | 66.4 | 63.4 |

(*) Ethylene oxide adduct of acetylene glycol (manufactured by Kawaken Fine Chemicals Co., Ltd.; surfactant)

(Preparation of Magenta Ink)

The respective components shown in Table 3 below were mixed and sufficiently stirred. After that, the resultant was filtered through a membrane filter having a pore size of 0.2 μm under pressure to prepare a magenta ink M1.

TABLE 3

|  |  | Magenta Ink M1 |
|---|---|---|
| Coloring material | Formula (M-a) | 5.0 |
| Water-soluble organic solvent | Glycerin | 6.0 |
|  | Ethylene glycol | 5.0 |
|  | Polyethylene glycol 200 | 2.0 |
|  | Diethylene glycol | 3.0 |
|  | Triethylene glycol |  |
|  | N-methyl-2-pyrrolidone |  |
|  | Urea | 8.0 |
| Acetylenol EH (*) |  | 0.8 |
| Isopropanol |  | 2.5 |
| Ion-exchanged water |  | 67.7 |

(*) Ethylene oxide adduct of acetylene glycol (manufactured by Kawaken Fine Chemicals Co., Ltd.; surfactant)

(Preparation of Cyan Ink)

The respective components shown in Table 4 below were mixed and sufficiently stirred. After that, the resultant was filtered through a membrane filter having a pore size of 0.2 μm under pressure to prepare each of cyan inks C1 and C2.

TABLE 4

|  |  | Cyan Ink | |
|---|---|---|---|
|  |  | C1 | C2 |
| Coloring material | Formula (C-a) | 5.0 |  |
|  | Exemplified Compound C1 |  | 5.0 |
| Water-soluble organic solvent | Glycerin | 10.0 | 6.0 |
|  | Ethylene glycol | 6.0 | 6.0 |
|  | Polyethylene glycol 200 |  | 3.0 |
|  | Diethylene glycol |  |  |
|  | Triethylene glycol | 2.0 | 2.0 |
|  | N-methyl-2-pyrrolidone | 5.0 | 5.0 |
|  | Urea | 10.0 | 10.0 |
| Acetylenol EH (*) |  | 0.5 | 0.6 |
| Isopropanol |  | 3.0 | 2.5 |
| Ion-exchanged water |  | 58.5 | 59.9 |

(*) Ethylene oxide adduct of acetylene glycol (manufactured by Kawaken Fine Chemicals Co., Ltd.; surfactant)

Exemplified Compound C1 is a coloring material having the following structure.

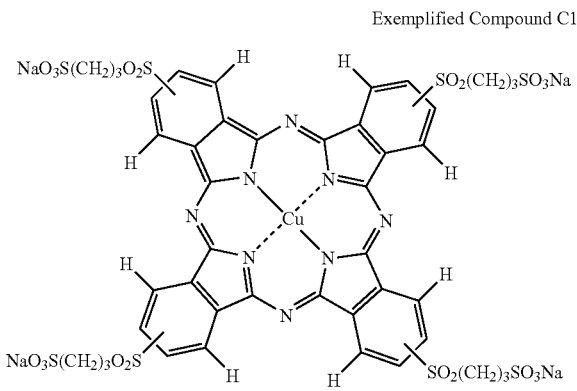

Exemplified Compound C1

(A Combination of Ink for Evaluation and Ink to be Used in Combination Therewith)

The yellow inks Y1 to Y5, the magenta ink M1, and the cyan inks C1 and C2 thus prepared were combined as shown in Table 5 below.

TABLE 5

|  |  | Ink for evaluation | Ink to be used in combination with ink for evaluation | |
|---|---|---|---|---|
|  |  | Yellow | Cyan | Magenta |
| Example | 1 | Y1 | C1 | — |
|  | 2 | Y2 | C2 | — |
|  | 3 | Y3 | C1 | — |
|  | 4 | Y1 | — | M1 |
|  | 5 | Y2 | — | M1 |
|  | 6 | Y3 | — | M1 |
|  | 7 | Y1 | C1 | M1 |
|  | 8 | Y2 | C2 | M1 |
|  | 9 | Y3 | C1 | M1 |
| Comparative Example | 1 | Y4 | C2 | — |
|  | 2 | Y5 | C1 | — |
|  | 3 | Y4 | — | M1 |
|  | 4 | Y5 | — | M1 |
|  | 5 | Y4 | C2 | M1 |
|  | 6 | Y5 | C1 | M1 |

(Evaluation of Environmental Gas Resistance)

An ink jet recording apparatus (trade name: Pixus 950i; manufactured by CANON Inc.) was filled with any one of the combinations of the respective inks thus prepared shown in Table 5 to print, on a recording medium (trade-name: PR-101; manufactured by CANON Inc.), each of an image having an initial reflection density of a yellow ink alone of 1.0, an image having a total duty of 100% (each of a yellow ink and a cyan ink accounted for 50% thereof), an image having a total duty of 100% (each of a yellow ink and a magenta ink accounted for 50% thereof), and an image having an initial reflection density of composite black composed of three colors (that is, a yellow ink, a magenta ink, and a cyan ink) of 1.0 as test samples.

Each of the test samples thus prepared was placed in a chamber of a gaseous corrosion tester GH-180 (manufactured by Yamasaki-Seiki Co, Ltd.), and was exposed for 432 hours under the conditions of: a temperature of 24° C.; a humidity of 60%; an ozone gas concentration of 1.2 ppm; an $NO_x$ concentration of 1.25 ppm; an $SO_2$ concentration of 0.3 ppm; and a gas flow rate of 2 L/min.

After the exposure test, the concentration remaining degree of a yellow ink alone, a secondary color composed of a yellow ink and a cyan ink, a secondary color composed of a yellow ink and a magenta ink, and a color fading balance in composite black were measured. A Spectorino (manufactured by Gretag Macbeth) was used for measuring a reflection density.

A concentration remaining degree was calculated from the following expression.

Concentration remaining degree=(Reflection density after exposure test/Reflection density before exposure test)×100 (%)

In addition, a color fading balance was evaluated on the basis of a ΔOD value in each of: an image with a secondary color composed of a yellow ink and a cyan ink; an image with a secondary color composed of a yellow ink and a magenta ink; and an image with composite black. The ΔOD value refers to a difference between the maximum concentration remaining degree and minimum concentration remaining degree of each of a yellow component, a cyan component, and a magenta component in an image with a secondary color or in an image with composite black. A large ΔOD value means a bad color fading balance because a hue shifts to any one of the yellow component, the cyan component, and the magenta component.

A ΔOD value was calculated from the following expression.

ΔOD=(Maximum concentration remaining degree of each color component in an image with a secondary color or in an image with composite black)−(Minimum concentration remaining degree of each color component in an image with a secondary color or in an image with composite black)

Environmental gas resistance was evaluated according to the following criteria on the basis of the concentration remaining degree and the ΔOD value thus obtained.

(1) Concentration remaining degree of yellow ink alone
A: A concentration remaining degree is 70% or more.
B: A concentration remaining degree is 65% or more and less than 70%.
C: A concentration remaining degree is less than 65%.
(2) Color fading balance
A: ΔOD is less than 10.
B: ΔOD is 10 or more and less than 15.
C: ΔOD is 15 or more.

TABLE 6

|  |  | Environmental gas resistance | |
|---|---|---|---|
|  |  | Concentration remaining degree of yellow ink alone | Color fading balance |
| Example | 1 | A | A |
|  | 2 | A | A |
|  | 3 | A | A |
|  | 4 | A | A |
|  | 5 | A | A |
|  | 6 | A | A |
|  | 7 | A | A |
|  | 8 | A | A |
|  | 9 | A | A |
| Comparative Example | 1 | A | C |
|  | 2 | C | A |
|  | 3 | A | C |
|  | 4 | C | A |
|  | 5 | A | C |
|  | 6 | C | A |

The foregoing has shown the following. In each of Comparative Examples 1, 3, and 5 each involving the use of only a coloring material belonging to the A group as a coloring material of a yellow ink, the color fading ratio of the yellow ink was lower than those of a magenta ink and a cyan ink, so there was a tendency in that a color fading balance was lost and an image became strongly yellowish in its entirety. In addition, in each of Comparative Examples 2, 4, and 6 each involving the use of only a coloring material belonging to the B group as a coloring material of a yellow ink, the yellow ink, the magenta ink, and the cyan ink can be arranged into the magenta ink, the cyan ink, and the yellow ink in order of decreasing degree of color fading in each color, so a color fading balance was good, but the concentration remaining degree of the yellow ink alone was low, and the color fading of a yellow portion in an entire image was remarkable. In addition, the use of such coloring material as specified in the present invention for each ink provided an image with excellent light resistance.

This application claims priorities from Japanese Patent Application Nos. 2004-221836 filed on Jul. 29, 2004 and 2005-216228 filed on Jul. 26, 2005, which are hereby incorporated by reference herein.

What is claimed is:

1. An ink set composed of multiple inks comprising at least:
   an ink jet cyan ink comprising one of a compound represented by the following general formula (1) and a compound represented by the following general formula (2) as a coloring material; and
   an ink jet yellow ink comprising at least one kind of coloring material selected from the following A group and at least one kind of coloring material selected from the following B group;
   A group: C.I. Direct Yellow 132 and C.I. Direct Yellow 173
   B group: C.I. Direct Yellow 142, C.I. Direct Yellow 86, and a compound represented by the following general formula (3);

General formula (1):

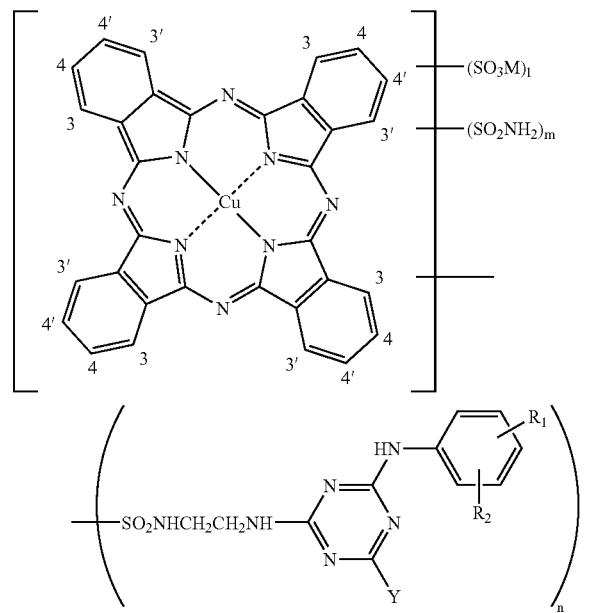

wherein M represents an alkali metal or ammonium; $R_1$ and $R_2$ each independently represent a hydrogen atom, a sulfonic group, or a carboxyl group, provided that $R_1$ and $R_2$ are not simultaneously a hydrogen atom; Y represents a chlorine atom, a hydroxyl group, an amino group, or a monoalkylamino or dialkylamino group; l represents 0 to 2, m represents 1 to 3, and n represents 1 to 3, provided that l+m+n=3 to 4; and positions at which substituents are present are 4- or 4'-positions;

General formula (2):

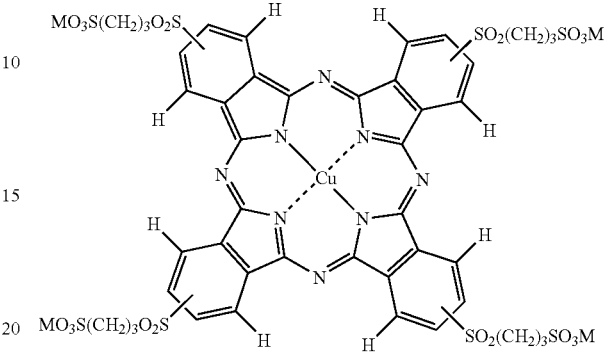

wherein M represents a hydrogen atom, an alkali metal, ammonium, or an organic ammonium;

General formula (3):

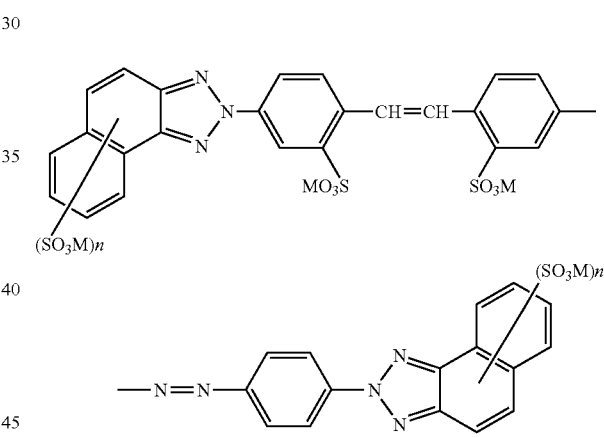

wherein M's each independently represent a hydrogen atom, an alkali metal, an alkali earth metal, a cation of organic amine or an ammonium ion, and n's each independently represent 1 or 2.

2. An ink set composed of multiple inks comprising at least:
   an ink jet magenta ink comprising one of a compound represented by the following general formula (4) and a salt thereof as a coloring material; and
   an ink jet yellow ink comprising at least one kind of coloring material selected from the following A group and at least one kind of coloring material selected from the following B group;
   A group: C.I. Direct Yellow 132 and C.I. Direct Yellow 173
   B group: C.I. Direct Yellow 142, C.I. Direct Yellow 86, and a compound represented by the following general formula (3);

General formula (4):

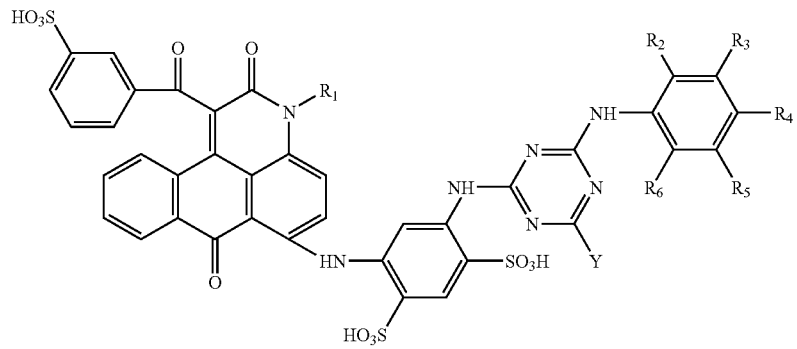

wherein $R_1$ represents a hydrogen atom, an alkyl group, a hydroxy lower alkyl group, a cyclohexyl group, a monoalkyl aminoalkyl or dialkyl aminoalkyl group, or a cyano lower alkyl group; Y represents a chlorine atom, a hydroxyl group, an amino group, or a monoalkylamino or dialkylamino group, which may have a substituent selected from the group consisting of a sulfonic group, a carboxyl group, and a hydroxyl group on an alkyl group; and $R_2$, $R_3$, $R_4$, $R_5$, and $R_6$ each independently represent a hydrogen atom, an alkyl group having 1 to 8 carbon atoms, or a carboxyl group, provided that $R_2$, $R_3$, $R_4$, $R_5$, and $R_6$ are not simultaneously a hydrogen atom;

3. An ink set composed of multiple inks comprising at least:
- an ink jet cyan ink comprising one of a compound represented by the following general formula (1) and a compound represented by the following general formula (2) as a coloring material;
- an ink jet magenta ink comprising one of a compound represented by the following general formula (4) and a salt thereof as a coloring material; and
- an ink jet yellow ink comprising at least one kind of coloring material selected from the following A group and at least one kind of coloring material selected from the following B group;

General formula (3):

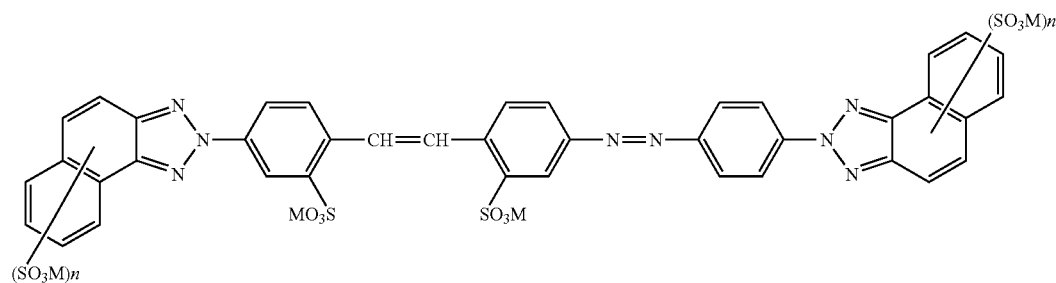

wherein M's each independently represent a hydrogen atom, an alkali metal, an alkali earth metal, a cation of organic amine or an ammonium ion, and n's each independently represent 1 or 2.

A group: C.I. Direct Yellow 132 and C.I. Direct Yellow 173
B group: C.I. Direct Yellow 142, C.I. Direct Yellow 86, and a compound represented by the following general formula (3);

General formula (1):

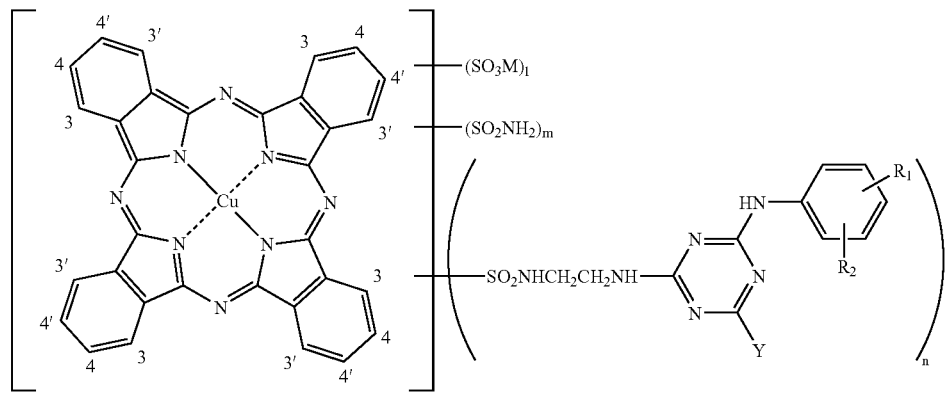

wherein M represents an alkali metal or ammonium; $R_1$ and $R_2$ each independently represent a hydrogen atom, a sulfonic group, or a carboxyl group, provided that $R_1$ and $R_2$ are not simultaneously a hydrogen atom; Y represents a chlorine atom, a hydroxyl group, an amino group, or a monoalkylamino or dialkylamino group; l represents 0 to 2, m represents 1 to 3, and n represents 1 to 3, provided that l+m+n=3 to 4; and positions at which substituents are present are the 4- or 4'-positions;

General formula (2):

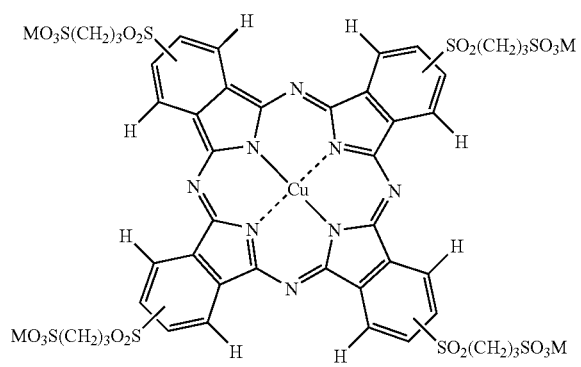

wherein M represents a hydrogen atom, an alkali metal, ammonium, or an organic ammonium;

General formula (3):

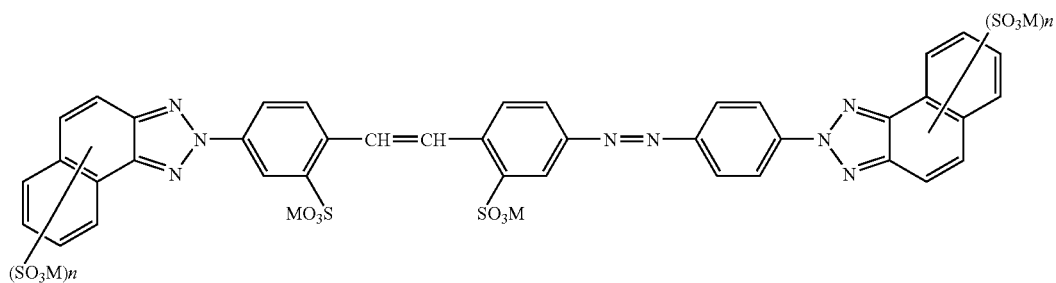

wherein M's each independently represent a hydrogen atom, an alkali metal, an alkali earth metal, a cation of organic amine or an ammonium ion, and n's each independently represent 1 or 2;

General formula (4):

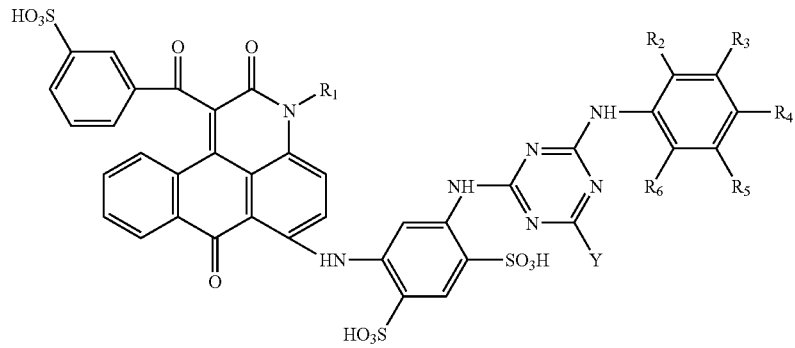

wherein $R_1$ represents a hydrogen atom, an alkyl group, a hydroxy lower alkyl group, a cyclohexyl group, a monoalkyl aminoalkyl or dialkyl aminoalkyl group, or a cyano lower alkyl group; Y represents a chlorine atom, a hydroxyl group, an amino group, or a monoalkylamino or dialkylamino group, which may have a substituent selected from the group consisting of a sulfonic group, a carboxyl group, and a hydroxyl group on an alkyl group; and $R_2$, $R_3$, $R_4$, $R_5$, and $R_6$ each independently represent a hydrogen atom, an alkyl group having 1 to 8 carbon atoms, or a carboxyl group, provided that $R_2$, $R_3$, $R_4$, $R_5$, and $R_6$ are not simultaneously a hydrogen atom.

4. An ink cartridge, comprising an ink storage portion for storing an ink set composed of multiple inks, wherein the ink set comprises the ink set according to claim 1.

5. An ink jet recording method, comprising ejecting ink by an ink jet method to perform recording on a recording medium, wherein the ink comprises all of the inks of the ink set according to claim 1.

6. A recording unit, comprising an ink storage portion for storing ink and a recording head for ejecting the ink, wherein the ink comprises all of the inks of the ink set according to claim 1.

7. An ink jet recording apparatus, comprising an ink storage portion for storing ink and a recording head for ejecting the ink, wherein the ink comprises all of the inks of the ink set according to claim 1.

* * * * *

UNITED STATES PATENT AND TRADEMARK OFFICE
CERTIFICATE OF CORRECTION

| | |
|---|---|
| PATENT NO. | : 7,241,332 B2 |
| APPLICATION NO. | : 11/339651 |
| DATED | : July 10, 2007 |
| INVENTOR(S) | : Jun Yoshizawa et al. |

It is certified that error appears in the above-identified patent and that said Letters Patent is hereby corrected as shown below:

<u>COLUMN 5</u>

Line 61, "carboxylgroup" should read --carboxyl group--.

<u>COLUMN 15</u>

Line 3, "aminioalkyl" should read --aminoalkyl--.

<u>COLUMN 33</u>

Line 7, "Additive" should read --Additives--.

<u>COLUMN 38</u>

Line 47, "so-called an" should read --a so-called--.

<u>COLUMN 39</u>

Line 1, "anon-demand" should read --an on-demand--.

<u>COLUMN 41</u>

Line 61, "phthalocyanine." should read --phthalocyanine--.

UNITED STATES PATENT AND TRADEMARK OFFICE
CERTIFICATE OF CORRECTION

| | |
|---|---|
| PATENT NO. | : 7,241,332 B2 |
| APPLICATION NO. | : 11/339651 |
| DATED | : July 10, 2007 |
| INVENTOR(S) | : Jun Yoshizawa et al. |

It is certified that error appears in the above-identified patent and that said Letters Patent is hereby corrected as shown below:

COLUMN 42

Line 16, "was" should read --were--.

Signed and Sealed this

Twentieth Day of May, 2008

JON W. DUDAS
*Director of the United States Patent and Trademark Office*